US009916242B2

(12) United States Patent
Ogasawara et al.

(10) Patent No.: US 9,916,242 B2
(45) Date of Patent: Mar. 13, 2018

(54) STORAGE SYSTEM AND MONITOR DEVICE

(71) Applicant: FUJITSU LIMITED, Kawasaki-shi, Kanagawa (JP)

(72) Inventors: Yasuhiro Ogasawara, Fujisawa (JP); Hidetoshi Nishi, Nagano (JP); Shigeru Akiyama, Kawasaki (JP); Tsukasa Matsuda, Kawasaki (JP); Tatsuya Yanagisawa, Kawasaki (JP); Hidefumi Kobayashi, Yokohama (JP); Satoshi Yazawa, Kawasaki (JP); Atsushi Igashira, Yokohama (JP); Wataru Iizuka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 7 days.

(21) Appl. No.: 15/335,740

(22) Filed: Oct. 27, 2016

(65) Prior Publication Data
US 2017/0132129 A1 May 11, 2017

(30) Foreign Application Priority Data
Nov. 5, 2015 (JP) .................................. 2015-217192

(51) Int. Cl.
*G06F 12/08* (2016.01)
*G06F 1/26* (2006.01)
*G06F 1/32* (2006.01)
*G06F 12/0806* (2016.01)

(52) U.S. Cl.
CPC .......... *G06F 12/0806* (2013.01); *G06F 1/263* (2013.01); *G06F 1/3212* (2013.01); *G06F 2212/621* (2013.01)

(58) Field of Classification Search
CPC ... G06F 1/26; G06F 1/32; G06F 12/08; G06F 2212/621
See application file for complete search history.

(56) References Cited

U.S. PATENT DOCUMENTS

2005/0021906 A1 1/2005 Nakamura et al.
2005/0216660 A1 9/2005 Kobayashi et al.

FOREIGN PATENT DOCUMENTS

JP 2005-43930 2/2005
WO WO 2004/114115 A1 12/2004

*Primary Examiner* — Aracelis Ruiz
(74) *Attorney, Agent, or Firm* — Staas & Halsey LLP

(57) ABSTRACT

A storage system includes control devices and a second processor. The second processor determines a number of abnormal batteries when an abnormality has occurred in a first battery. The second processor assigns a second cache currently assigned to a second control device associated with the first battery to a first control device when the number is smaller than a threshold. The second processor assigns a mirror cache currently assigned to the second control device to a third control device when the number is smaller than the threshold. The second processor instructs the first control device to control write to a first storage device associated with a first cache by using the first cache. Data of the first cache is mirrored to the mirror cache. The second processor instructs the first control device to control write to a second storage device associated with the second cache by using the second cache.

8 Claims, 24 Drawing Sheets

FIG. 6

VOLUME MANAGEMENT TABLE 113a

| LUN | RAID LEVEL | PHYSICAL STORAGE AREA | INITIAL STATE | | CURRENT STATE | |
|---|---|---|---|---|---|---|
| | | | LOCAL CACHE | MIRROR CACHE | LOCAL CACHE | MIRROR CACHE |
| LUN#1 | RAID-1 | DE#1-DISK#0001<br>DE#2-DISK#0001 | CM#1 | CM#2 | CM#1 | CM#2 |
| LUN#2 | RAID-1 | DE#2-DISK#0002 ... | CM#2 | CM#3 | CM#2 | CM#3 |
| LUN#3 | RAID-5 | DE#3-DISK#0001 ... | CM#3 | CM#4 | CM#3 | CM#4 |
| LUN#4 | RAID-5 | DE#4-DISK#0001 ... | CM#4 | CM#5 | CM#4 | CM#5 |
| LUN#5 | RAID-1 | DE#1-DISK#0010 ... | CM#5 | CM#6 | CM#5 | CM#6 |
| LUN#6 | RAID-1 | DE#2-DISK#0020 ... | CM#6 | CM#7 | CM#6 | CM#7 |
| LUN#7 | RAID-5 | DE#3-DISK#0010 ... | CM#7 | CM#8 | CM#7 | CM#8 |
| LUN#8 | RAID-5 | DE#4-DISK#0020 ... | CM#8 | CM#1 | CM#8 | CM#1 |

FIG. 7

| CONFIGURATION MANAGEMENT TABLE | | | | 113b |
|---|---|---|---|---|
| CE ID | CM ID | BACKWARD CM | FORWARD CM | |
| CE#1 | CM#1 | CM#8 | CM#2 | |
| CE#2 | CM#2 | CM#1 | CM#3 | |
| CE#3 | CM#3 | CM#2 | CM#4 | |
| CE#4 | CM#4 | CM#3 | CM#5 | |
| CE#1 | CM#5 | CM#4 | CM#6 | |
| CE#2 | CM#6 | CM#5 | CM#7 | |
| CE#3 | CM#7 | CM#6 | CM#8 | |
| CE#4 | CM#8 | CM#7 | CM#1 | |

| LUN | CURRENT STATE | |
|---|---|---|
| | LOCAL CACHE | MIRROR CACHE |
| LUN#1 | CM#1 | CM#3 |
| LUN#2 | CM#1 | CM#3 |
| LUN#3 | CM#3 | CM#4 |
| LUN#4 | CM#4 | CM#5 |
| LUN#5 | CM#5 | CM#7 |
| LUN#6 | CM#5 | CM#7 |
| LUN#7 | CM#7 | CM#8 |
| LUN#8 | CM#8 | CM#1 |

113a

| LUN | CURRENT STATE | |
|---|---|---|
| | LOCAL CACHE | MIRROR CACHE |
| LUN#1 | CM#1 | (CM#2) |
| LUN#2 | CM#2 | (CM#3) |
| LUN#3 | CM#3 | CM#4 |
| LUN#4 | CM#4 | (CM#5) |
| LUN#5 | CM#5 | (CM#6) |
| LUN#6 | CM#6 | (CM#7) |
| LUN#7 | CM#7 | CM#8 |
| LUN#8 | CM#8 | (CM#1) |

113b

| CM ID | BACKWARD CM | FORWARD CM |
|---|---|---|
| CM#1 | CM#8 | CM#3 |
| CM#2 | – | – |
| CM#3 | CM#1 | CM#4 |
| CM#4 | CM#3 | CM#5 |
| CM#5 | CM#4 | CM#7 |
| CM#6 | – | – |
| CM#7 | CM#5 | CM#8 |
| CM#8 | CM#7 | CM#1 |

113b

| CM ID | BACKWARD CM | FORWARD CM |
|---|---|---|
| CM#1 | CM#8 | CM#2 |
| CM#2 | CM#1 | CM#3 |
| CM#3 | CM#2 | CM#4 |
| CM#4 | CM#3 | CM#5 |
| CM#5 | CM#4 | CM#6 |
| CM#6 | CM#5 | CM#7 |
| CM#7 | CM#6 | CM#8 |
| CM#8 | CM#7 | CM#1 |

STORAGE SYSTEM AND MONITOR DEVICE

CROSS-REFERENCE TO RELATED APPLICATION

This application is based upon and claims the benefit of priority of the prior Japanese Patent Application No. 2015-217192, filed on Nov. 5, 2015, the entire contents of which are incorporated herein by reference.

FIELD

The embodiments discussed herein are related to a storage system and a monitor device.

BACKGROUND

A write-back method has been known as a method of writing data using a cache. For example, in a case in which write to a storage device is controlled through the write-back method, a control device responds to a host at a point in time at which write data transmitted from the host is written to a cache. The control device writes the write data store in the cache to the storage device at a timing which is not synchronized with the write to the cache, for example, during a spare time in a subsequent process.

A write-through method has been known as another method of writing data using a cache. For example, in a case in which the write to the storage device is controlled through the write-through method, the control device responds to the host after the write data transmitted from the host is written in the cache and the storage device. As described above, in the write-through method, the write to the storage device occurs before the control device responds to the host, and thus the performance of an access process is deteriorated compared to the write-back method.

As an example of a technology related to a cache, a technology as follows has been proposed. In the technology, in a case in which a problem has occurred in a second cache memory to which data stored in a first cache memory is mirrored, the data is mirrored to a third cache memory in which a problem has not occurred.

In addition, as an example of another technology related to a cache, a storage system has been proposed in which a plurality of control devices each include a local cache and a mirror cache, and the local cache of a certain control device is duplicated with the mirror cache of an adjacent control device, thereby cyclically duplicating the caches.

Related techniques are disclosed in, for example, Japanese Laid-open Patent Publication No. 2005-43930 and International Patent Pamphlet No. WO 2004/114115.

SUMMARY

According to an aspect of the present invention, provided is a storage system including a plurality of control devices defined as disposed in a circular arrangement, an electric power source, a plurality of batteries, and a second processor. The plurality of control devices each include a memory to which a local cache and a mirror cache are assigned, and a first processor coupled to the memory. The first processor is configured to control write to a storage device of a plurality of storage devices by using the local cache through a write-back method. The storage device is associated with the local cache. The first processor is configured to mirror data of the local cache to the mirror cache assigned to the memory of another control device of the plurality of control devices. The another control device is disposed adjacent in a first direction in the circular arrangement. The electric power source is configured to supply electric power to the memory included in each of the plurality of control devices. The plurality of batteries are associated with the plurality of control devices such that control devices disposed adjacent to each other in the circular arrangement are associated with different batteries. Each of the plurality of batteries supplies electric power to the memory included in each of the plurality of control devices associated with each of the plurality of batteries in a case in which the electric power of the electric power source is cut off. The second processor is configured to determine a number of abnormal batteries among the plurality of batteries in a case in which a first abnormality has occurred in a first battery of the plurality of batteries. The second processor is configured to assign a second local cache to a first memory of a first control device in a case in which the number of abnormal batteries is smaller than a predetermined threshold. The second local cache is currently assigned to a second memory of a second control device associated with the first battery. The first control device is disposed adjacent to the second control device in a reverse direction of the first direction in the circular arrangement. The second processor is configured to assign a first mirror cache to a third memory of a third control device in a case in which the number of abnormal batteries is smaller than the predetermined threshold, the first mirror cache being currently assigned to the second memory. The third control device is disposed adjacent to the second control device in the first direction in the circular arrangement. The second processor is configured to instruct the first control device to control write to a first storage device associated with a first local cache by using the first local cache through the write-back method. Data of the first local cache is mirrored to the first mirror cache. The second processor is configured to instruct the first control device to control write to a second storage device associated with the second local cache by using the second local cache through the write-back method.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a volume management table;

FIG. 7 is a diagram illustrating an example of a configuration management table;

FIG. 16 is a diagram illustrating changes in tables when an assignment state of local caches and mirror caches is transitioned from a second state to a third state;

DESCRIPTION OF EMBODIMENTS

In the storage system, in which the caches are cyclically duplicated, there is a case in which a plurality of batteries are provided which supply electric power to the caches of the respective control devices when the electric power is cut off. In the storage system, in a case in which abnormalities occur in the batteries, the risk of erasing data in the caches becomes higher when the electric power is cut off. Here, for example, the following operations to protect the data stored in the local caches may be taken into consideration. A control device, which has received the supply of electric power from a battery in which an abnormality has occurred, switches the data write from the write-back method to the write-through method. In addition, since there is a possibility that it will be difficult to maintain the duplication of the caches, a control device which mirrors the data of the cache to the mirror cache of the troubled control device also switches the data write from the write-back method to the write-through method.

However, with these operations, since a plurality of control devices control data write through the write-through method, there is a problem in that the performance of an access process is deteriorated in the storage system.

Hereinafter, embodiments will be described with reference to the accompanying drawings.

First Embodiment

Figure 1:
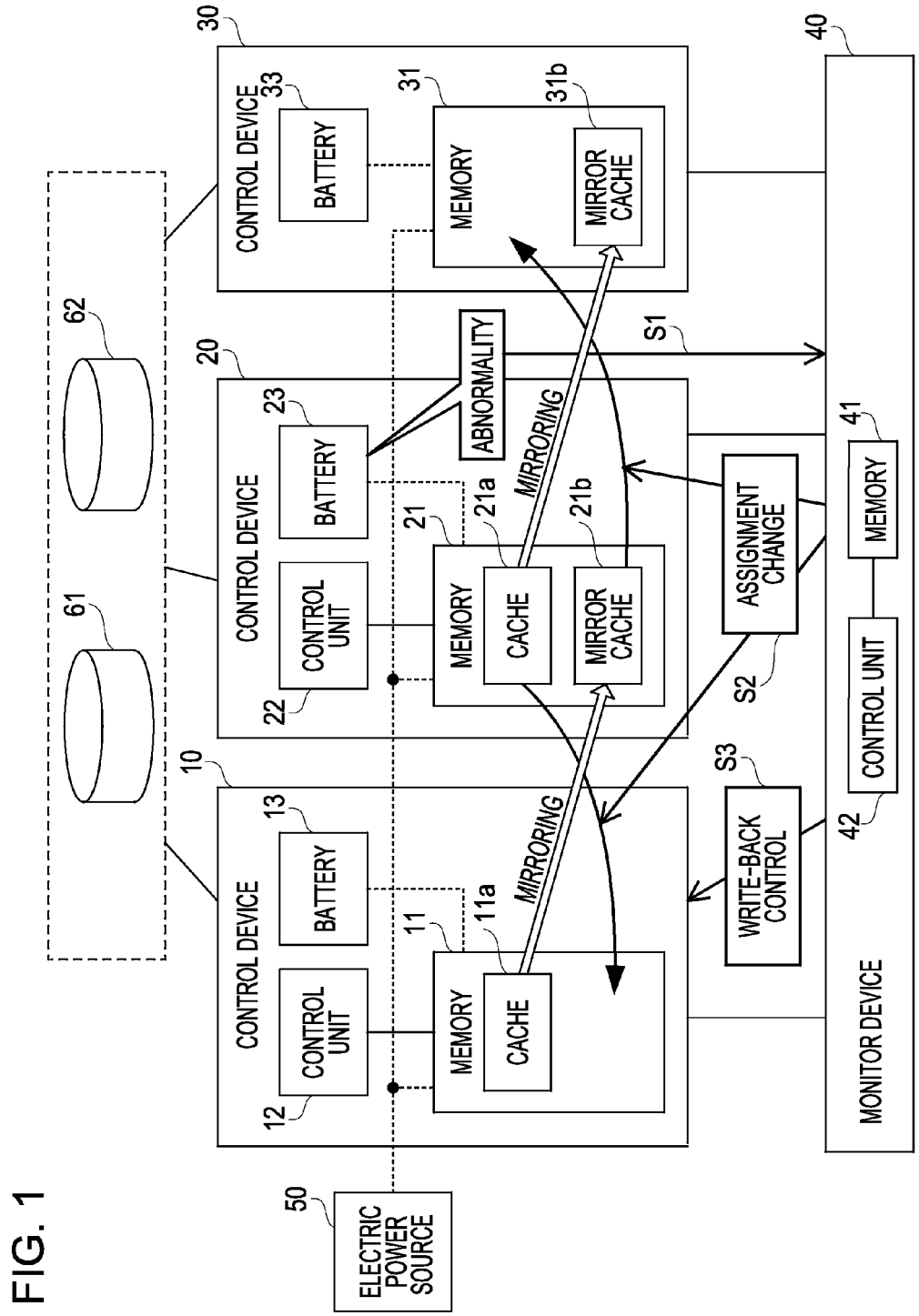
FIG. 1 is a diagram illustrating a storage system according to a first embodiment.

FIG. 1 is a diagram illustrating a storage system according to a first embodiment. The storage system illustrated in FIG. 1 includes control devices 10, 20, and 30, a monitor device 40, an electric power source 50, and storage devices 61 and 62. The control devices 10, 20, and 30 and the monitor device 40 are coupled to each other through, for example, a network, a bus, or the like.

The control device 10 includes a memory 11, a control unit 12, and a battery 13. The memory 11 is, for example, a volatile storage device such as a random access memory (RAM). The control unit 12 is, for example, a processor. A cache 11a is assigned to the memory 11. The control unit 12 controls write to the storage device 61 using the cache 11a through a write-back method. The storage device 61 is, for example, a non-volatile storage device such as a hard disk drive (HDD). The battery 13 supplies electric power to the memory 11 in a case in which electric power supply from the electric power source 50 to the memory 11 is stopped.

The control device 20 includes a memory 21, a control unit 22, and a battery 23. The memory 21 is, for example, a volatile storage device such as a RAM. The control unit 22 is, for example, a processor. A cache 21a and a mirror cache 21b, in which mirror data of the cache 11a is stored, are assigned to the memory 21. The control unit 22 controls write to the storage device 62 using the cache 21a through the write-back method. The battery 23 supplies electric power to the memory 21 in a case in which electric power supply from the electric power source 50 to the memory 21 is stopped.

The control device 30 includes a memory 31 and a battery 33. The memory 31 is, for example, a volatile storage device such as a RAM. A mirror cache 31b, in which mirror data of the cache 21a is stored, is assigned to the memory 31. The battery 33 supplies electric power to the memory 31 in a case in which electric power supply from the electric power source 50 to the memory 31 is stopped.

The electric power source 50 supplies electric power to the memories 11, 21, and 31. For example, the electric power source 50 receives supply of commercial power source from the outside, and supplies electric power to the memories 11, 21, and 31.

Although the battery 13 is mounted in the control device 10 in the example of FIG. 1, the battery 13 may be disposed on the outside of the control device 10. Similarly, the battery 23 may be disposed on the outside of the control device 20 and the battery 33 may be disposed on the outside of the control device 30. The electric power source 50 may be provided separately for the respective memories 11, 21, and 31.

The monitor device 40 includes a memory 41 and a control unit 42. The memory 41 is, for example, a volatile storage device such as a RAM. The control unit 42 is, for example, a processor. The monitor device 40 is a device which monitors the operations of the control devices 10, 20, and 30 and performs processes depending on the operation states thereof. The monitor device 40 monitors, for example, whether or not an abnormality of the battery 23 has occurred.

In a case in which an abnormality of the battery 23 has occurred (S1), the monitor device 40 changes the assignment destination of the cache 21a from the memory 21 to the memory 11, and changes the assignment destination of the mirror cache 21b from the memory 21 to the memory 31 (S2). The monitor device 40 instructs the control device 10 to control the write to the storage device 61 using the cache 11a through the write-back method. In addition, the monitor device 40 instructs the control device 10 to control the write to the storage device 62 using the cache 21a, which is assigned to the memory 11, through the write-back method (S3).

If the electric power of the electric power source 50 is cut off thereafter, data in the memory 21 is lost in the control device 20 in a state in which the abnormality of the battery 23 has occurred. Therefore, if the state in which the cache 21a is assigned to the memory 21 is maintained, the risk of losing the data of the cache 21a becomes higher.

As another method of avoiding a situation in which data is lost as described above, a method of controlling the write to the storage device 62 using the cache 21a by the control unit 22 through the write-through method without changing the assignment destination of the cache 21a may be taken into consideration. With this method, the data of the cache 21a is safe even in a case in which the electric power of the electric power source 50 is cut off. However, the performance of access to the storage device 62 using the cache 21a is deteriorated. Furthermore, since the data of the mirror cache 21b may be lost in the case in which the electric power of the electric power source 50 is cut off, it is preferable that write to the storage device 61 using the cache 11a by the control unit 12 is controlled through the write-through method. However, in this case, the performance of access to the storage device 61 using the cache 11a by the control unit 12 is also deteriorated. That is, in this method, write control through the write-through method is performed in the plurality of control devices, and thus the performances of access are deteriorated in the plurality of control devices.

In contrast, since the abnormality of the battery 13 has not occurred in the control device 10, data in the memory 11 is maintained even in the case in which the electric power of the electric power source 50 is cut off. Therefore, in a case in which the assignment destination of the cache 21a is changed to the memory 11 as described above, it is possible to reduce a possibility that the data of the cache 21a is lost. In addition, similarly, in a case in which the assignment destination of the mirror cache 21b is changed to the memory 31, it is possible to reduce a possibility that the data of the mirror cache 21b is lost.

Therefore, in a case in which the above-described assignment change is performed, the data of both the cache 11a and the mirror cache 21b are maintained without incurring loss even in a case in which the electric power of the electric power source 50 is cut off thereafter, and the data of both the cache 21a and the mirror cache 31b are also maintained without incurring loss. Therefore, it is possible for the control unit 12 to control both the write to the storage device 61 using the cache 11a and the write to the storage device 62 using the cache 21a through the write-back method instead of the write-through method. Accordingly, it is possible to suppress the performance of write of both the control devices from being deteriorated, and, as a result, it is possible to suppress the performance of access from being deteriorated in the entire storage system.

Second Embodiment

Figure 2:
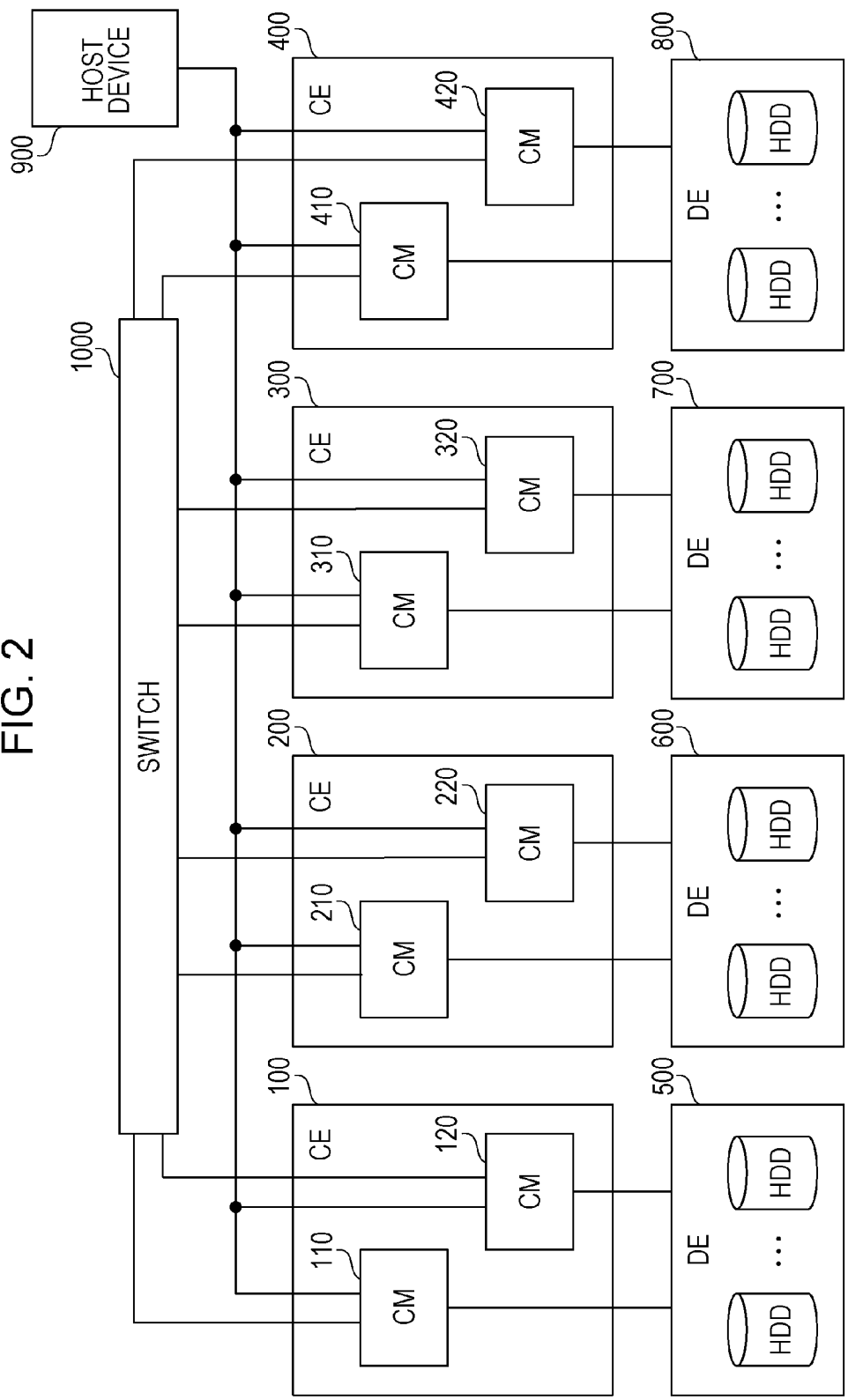
FIG. 2 is a diagram illustrating a storage system according to a second embodiment.

FIG. 2 is a diagram illustrating a storage system according to a second embodiment. The storage system illustrated in FIG. 2 includes controller enclosures (CEs) 100, 200, 300, and 400, device enclosures (DEs) 500, 600, 700, and 800, a host device 900, and a switch 1000.

The CE 100 includes controller modules (CMs) 110 and 120. The CE 200 includes CMs 210 and 220. The CE 300 includes CMs 310 and 320. The CE 400 includes CMs 410 and 420. The CMs 110, 120, 210, 220, 310, 320, 410, and 420 are coupled to each other through the switch 1000. For example, the CMs 110, 120, 210, 220, 310, 320, 410, and 420 and the switch 1000 are coupled through a serial cable.

The host device 900 is coupled to the CMs 110, 120, 210, 220, 310, 320, 410, and 420. The CMs 110, 120, 210, 220, 310, 320, 410, and 420 and the host device 900 are coupled through, for example, a storage area network (SAN) using a fibre channel (FC), an Internet small computer system interface (iSCSI), or the like. Although one host device 900 is coupled to the CMs 110, 120, 210, 220, 310, 320, 410, and 420 in FIG. 2 as an example, for example, a plurality of host devices may be respectively coupled to one or more CMs.

A plurality of storage devices are mounted in each of the DEs 500, 600, 700, and 800. In the present embodiment, the DEs 500, 600, 700, and 800 are disk array devices which each include HDDs as the storage devices. The storage devices which are mounted on the DEs 500, 600, 700, and 800 may be different types of storage devices such as solid state drives (SSDs) or the like.

The DE 500 is coupled to the CMs 110 and 120. CMs 110 and 120 control access to the HDDs which are mounted on the DE 500 in response to a request from the host device 900 or another CM. The DE 600 is coupled to the CMs 210 and 220. The CMs 210 and 220 control access to the HDDs which are mounted on the DE 600 in response to a request from the host device 900 or another CM. The DE 700 is coupled to the CMs 310 and 320. CMs 310 and 320 control access to the HDDs which are mounted on the DE 700 in response to a request from the host device 900 or another CM. The DE 800 is coupled to the CMs 410 and 420. CMs 410 and 420 control access to the HDDs which are mounted on the DE 800 in response to a request from the host device 900 or another CM.

The CE 100 and the DE 500 may be realized as a storage device which is mounted on, for example, one housing. The CE 200 and the DE 600, the CE 300 and the DE 700, and the CE 400 and the DE 800 may be realized similarly. The storage system in FIG. 2 has a configuration in which such storage devices are scaled out.

The number of CEs included in the storage system is not limited to four, and the number of CMs included in each CE is not limited to two. For example, the storage system may include twelve CEs each include two CMs.

Figure 3:
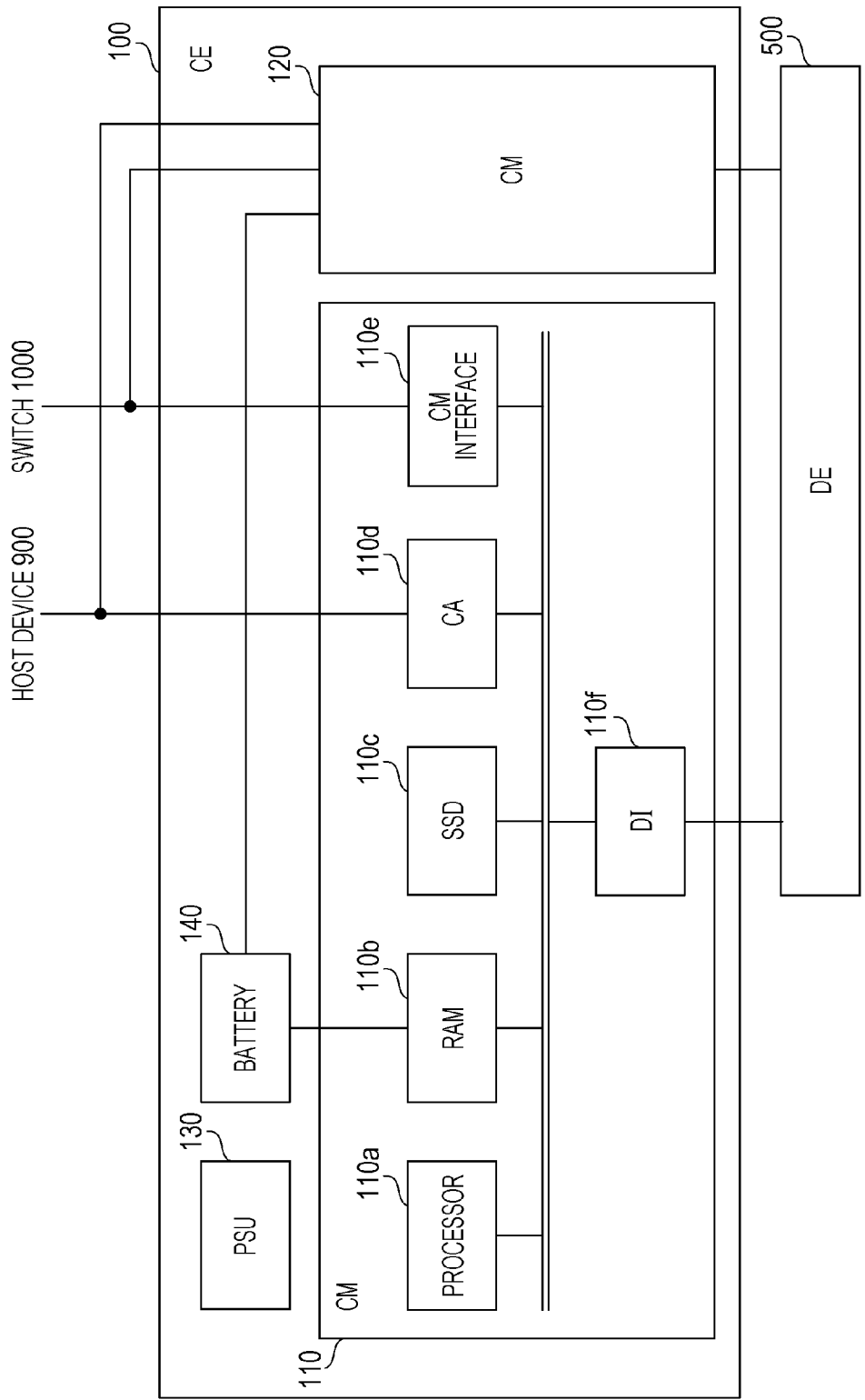
FIG. 3 is a diagram illustrating an exemplary hardware configuration of a CM.

FIG. 3 is a diagram illustrating an exemplary hardware configuration of a CM. The CM 110 includes a processor 110a, a RAM 110b, an SSD 110c, a channel adapter (CA) 110d, a CM interface 110e, and a device interface (DI) 110f.

The processor 110a controls information processing of the CM 110. The processor 110a may be a multi-processor that includes a plurality of processing elements.

The RAM 110b is a main storage device of the CM 110. The RAM 110b temporarily stores therein at least a part of programs of an operating system (OS) and applications to be executed by the processor 110a. The RAM 110b also stores therein various data which are used for processes performed by the processor 110a.

The SSD 110c is an auxiliary storage device of the CM 110. The SSD 110c is a non-volatile semiconductor memory. The SSD 110c stores therein the programs of the OS and the applications, and various data. The CM 110 may include an HDD as the auxiliary storage device instead of the SSD 110c.

The CA 110d is an interface for communicating with the host device 900. The CM interface 110e is an interface for communicating with other CMs through the switch 1000. The DI 110f is an interface for communicating with the DE 500.

The CMs 120, 210, 220, 310, 320, 410, and 420 may be realized using similar hardware to that of the CM 110.

The CE 100 includes a power supply unit (PSU) 130 and a battery 140. The PSU 130 receives the supply of electric power from the outside, and supplies the electric power to the entire CE 100. The battery 140 supplies electric power to the RAM 110b and a RAM included in the CM 120 in a case in which the electric power of the PSU 130 is cut off. The PSU and the battery are provided to each of the CEs, separately.

Figure 4:
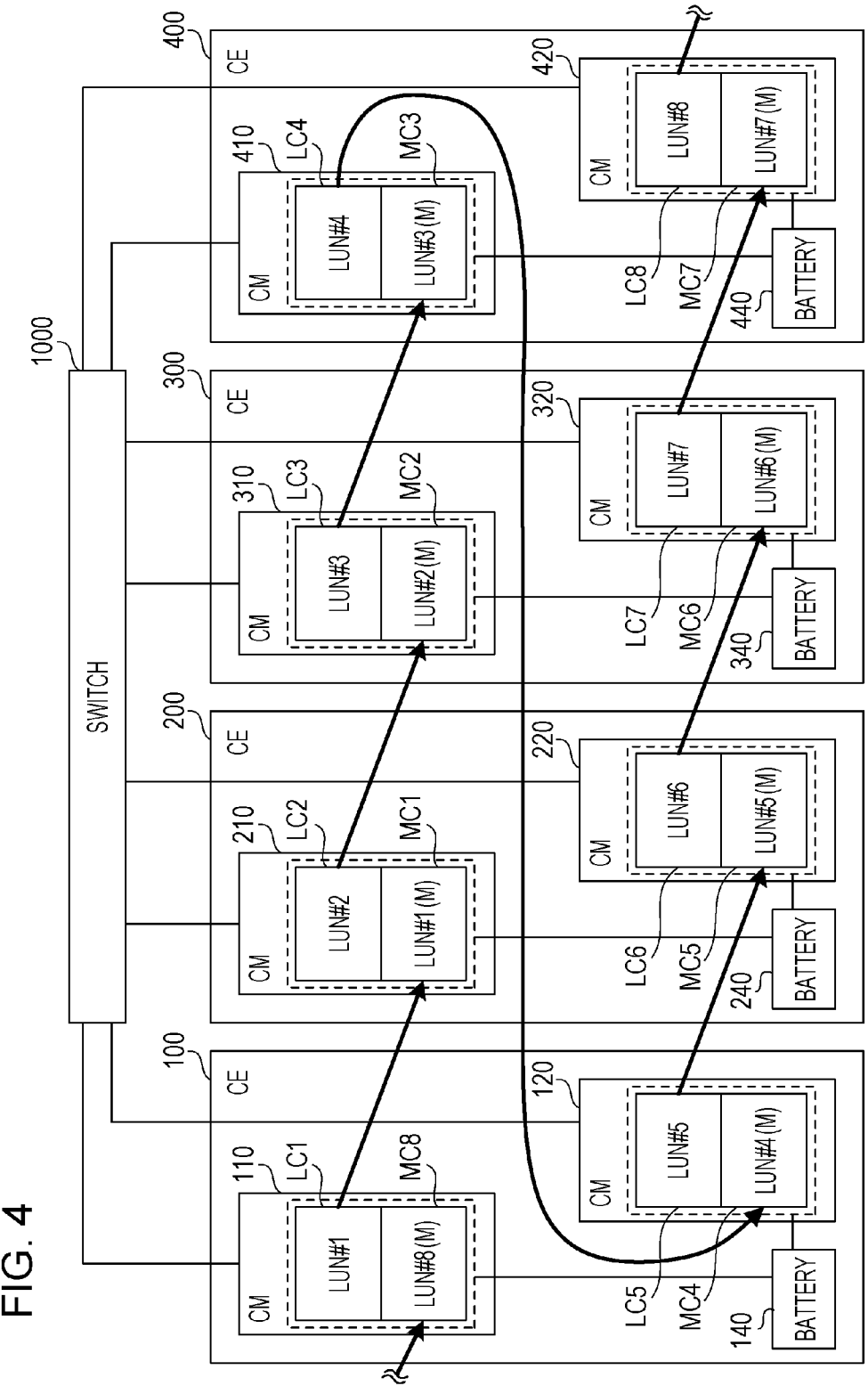
FIG. 4 is a diagram illustrating a relationship between cache areas and mirroring destinations.

FIG. 4 is a diagram illustrating a relationship between cache areas and mirroring destinations. In the storage system according to the present embodiment, the read and write of data between the host device 900 and each of the CMs is performed in units of a logical storage area called a logical unit (LU). A plurality of LUs are set In the storage system, and the CMs are assigned to the respective LUs to control access from the host device 900 to the respective LUs.

A CM, which is assigned in charge of access control to a certain LU, controls access to the relevant LU using a cache area secured in the RAM included in its own device. Hereinafter, a cache area, which is used in a case of access control to the LU, is referred to as a local cache. In the RAM, the local cache is secured for each LU. For example, in a case in which a CM is in charge of access control to two LUs, two local caches are secured in a RAM of the CM.

In the description below, there is a case in which a fact that an area of a local cache is secured in a RAM of a CM is described as "the local cache is assigned to the CM (or the RAM thereof)".

In FIG. 4, in order to simplify explanation, it is assumed that each of the CMs 110, 120, 210, 220, 310, 320, 410, and 420 controls access to one LU in response to an access request received from the host device 900. In this case, one local cache is assigned to each of the CMs 110, 120, 210, 220, 310, 320, 410, and 420.

In the storage system according to the present embodiment, an LU is identified by a logical unit number (LUN). Hereinafter, an LU which has an identification number "x" is described as "LUN#x". In the present embodiment, as an example, the CMs 110, 210, 310, 410, 120, 220, 320, and 420 control access to LUN#1, LUN#2, LUN#3, LUN#4, LUN#5, LUN#6, LUN#7, and LUN#8, respectively.

In this case, as illustrated in FIG. 4, a local cache LC1 corresponding to LUN#1 is assigned to the RAM 110b of the CM 110. A local cache LC2 corresponding to LUN#2 is assigned to the RAM of the CM 210. A local cache LC3 corresponding to LUN#3 is assigned to the RAM of the CM 310. A local cache LC4 corresponding to LUN#4 is assigned to the RAM of the CM 410. A local cache LC5 corresponding to LUN#5 is assigned to the RAM of the CM 120. A local cache LC6 corresponding to LUN#6 is assigned to the RAM of the CM 220. A local cache LC7 corresponding to LUN#7 is assigned to the RAM of the CM 320. A local cache LC8 corresponding to LUN#8 is assigned to the RAM of the CM 420.

In addition, a mirror cache is assigned to the RAM of each of the CMs. The mirror cache is an area in which mirror data of data which is stored in the local cache is stored. As will be described below, a mirror cache corresponding to a local cache assigned to a RAM of a certain CM is certainly assigned to a RAM of another CM. Therefore, the risk of losing cached data is reduced in a case in which the certain CM does not work.

In the storage system, the interrelation between the CMs 110, 120, 210, 220, 310, 320, 410, and 420 is set such that the CMs 110, 120, 210, 220, 310, 320, 410, and 420 are cyclically arranged. In FIG. 4, the arrangement is set such that the CMs are arranged in order from the CM 110 to the CM 210, from the CM 210 to the CM 310, from the CM 310 to the CM 410, from the CM 410 to the CM 120, from the CM 120 to the CM 220, from the CM 220 to the CM 320, from the CM 320 to the CM 420, and from the CM 420 to the CM 110.

A certain CM mirrors data, which is stored in a local cache thereof, to a mirror cache of another CM which is subsequently located in the above-described arrangement. In other words, a mirror cache corresponding to a local cache, which is assigned to the RAM of the certain CM, is assigned to the RAM of the CM which is subsequently located.

Specifically, as illustrated in FIG. 4, a mirror cache MC1 corresponding to LUN#1 is assigned to the RAM of the CM 210. The CM 110 mirrors the data of the local cache LC1 corresponding to LUN#1 to the mirror cache MC1. A mirror cache MC2 corresponding to LUN#2 is assigned to the RAM of the CM 310. The CM 210 mirrors the data of the local cache LC2 corresponding to LUN#2 to the mirror cache MC2.

A mirror cache MC3 corresponding to LUN#3 is assigned to the RAM of the CM 410. The CM 310 mirrors the data of the local cache LC3 corresponding to LUN#3 to the mirror cache MC3. A mirror cache MC4 corresponding to LUN#4 is assigned to the RAM of the CM 120. The CM 410 mirrors the data of the local cache LC4 corresponding to LUN#4 to the mirror cache MC4.

A mirror cache MC5 corresponding to LUN#5 is assigned to the RAM of the CM 220. The CM 120 mirrors the data of the local cache LC5 corresponding to LUN#5 to the mirror cache MC5. A mirror cache MC6 corresponding to LUN#6 is assigned to the RAM of the CM 320. The CM 220 mirrors the data of the local cache LC6 corresponding to LUN#6 to the mirror cache MC6.

A mirror cache MC7 corresponding to LUN#7 is assigned to the RAM of the CM 420. The CM 320 mirrors the data of the local cache LC7 corresponding to LUN#7 to the mirror cache MC7. A mirror cache MC8 corresponding to LUN#8 is assigned to the RAM 110b of the CM 110. The CM 420 mirrors the data of the local cache LC8 corresponding to LUN#8 to the mirror cache MC8.

As described above, data of a local cache of a certain CM is cyclically mirrored to an adjacent CM. The data of the local cache of the certain CM is certainly mirrored to a CM in a CE which is different from the CE on which the certain CM is mounted. With this configuration, even in a case in which operations stop in units of CE, at least any one of original data and mirror data is maintained without being erased for all of the local caches.

For example, it is assumed that the data of the local cache LC1 of the CM 110 is mirrored to the mirror cache on the RAM of the CM 120. With this configuration, in a case in which the operation of the CE 100 stops, both original data stored in the local cache and mirror data stored in the mirror cache are erased. In contrast, in the example of FIG. 4, the local cache LC1 of the CM 110 is mirrored to the mirror cache MC1 of the CM 210. Therefore, even though the operation of the CE 100 stops, the mirror data of the mirror cache MC1 securely remains, and, in contrast, even though the operation of the CE 200 stops, the original data of the local cache LC1 securely remains.

In the present embodiment, it is assumed that the assignment state of the local caches and the mirror caches as illustrated in FIG. 4 is a state (initial state) when the operation of the storage system starts. It is also assumed that, in the initial state, each CM controls the write of data for an LU corresponding to the local cache through the write-back method.

For example, the CM 110 performs access control as follows. The CM 110 receives a write request for LUN#1 and write data from the host device 900. The CM 110 stores the write data in the local cache LC1, transmits the write data to the CM 210, and requests the CM 210 to store the write data in the mirror cache MC1. In a case in which the write data is completely stored in the local cache LC1 and the mirror cache MC1, the CM 110 transmits a write completion response to the host device 900. Thereafter, the CM 110 stores the write data, which is stored in the local cache LC1, in a physical storage area (HDD) corresponding to LUN#1 at predetermined timing.

Storage areas of one or more arbitrary HDDs in the DEs 500, 600, 700, and 800 may be assigned as physical storage areas corresponding to an LU. For example, in a case in which an HDD in the DE 500 is assigned as a physical storage area corresponding to LUN#1, the CM 110 directly requests the HDD to store the write data. In a case in which an HDD in the DE 600 is assigned as a physical storage area corresponding to LUN#1, the CM 110 requests to store the write data in the HDD through the switch 1000 and the CM 210.

As will be described later, the CM may change the write control for the LU from the write-back method to the write-through method.

The CE 100 includes the battery 140. The battery 140 supplies electric power to the RAM 110b in the CM 110 and the RAM in the CM 120 in a case in which the electric power of the PSU 130 provided in the CE 100 is cut off. Therefore, even in a case in which the electric power of the PSU 130 is cut off in the initial state, the data of the local caches LC1 and LC5 and the data of the mirror caches MC8 and MC4 are maintained without being erased, and it is possible to take measures to evacuate the data to a non-volatile storage device.

Similarly, the CE 200 includes a battery 240. The battery 240 supplies electric power to the RAM in the CM 210 and the RAM in the CM 220 in a case in which electric power of a PSU provided in the CE 200 is cut off. Similarly, the CE 300 includes a battery 340. The battery 340 supplies electric power to the RAM in the CM 310 and the RAM in the CM 320 in a case in which electric power of a PSU provided in the CE 300 is cut off. Similarly, the CE 400 includes a battery 440. The battery 440 supplies electric power to the RAM in the CM 410 and the RAM in the CM 420 in a case in which electric power of a PSU provided in the CE 400 is cut off.

For example, a case in which the battery 240 of the CE 200 does not work in the initial state is taken into consideration. In the description below, there are cases in which a state in which a CM performs the write control for an LU through the write-back method is referred to as a "write-back operation" and a state in which the CM performs the write control for the LU through the write-through method is referred to as a "write-through operation".

A method of switching the CMs 210 and 220 in the CE 200 from the write-back operation to the write-through operation in a case in which the battery 240 does not work is taken into consideration. The reason for this is that, if the electric power of the PSU in the CE 200 is cut off thereafter, the data stored in the local cache LC2 and the mirror cache MC1 in the CM 210 and the data stored in the local cache LC6 and the mirror cache MC5 of the CM 220 are erased. In a case in which the CMs 210 and 220 are switched to the write-through operation, the data of the local caches LC2 and LC6 are stored in a relevant physical storage area (HDD), and thus it is possible to inhibit the data from being erased even in a case in which the electric power of the PSU is cut off.

However, if the electric power of the PSU of the CE 200 is cut off after only the CMs 210 and 220 are switched to the write-through operation, the data stored in the mirror caches MC1 and MC5 are erased. At this time, the duplication of the data of the local caches LC1 and LC5 is not realized, and thus the safety of the data of the local caches LC1 and LC5 is deteriorated. For example, in a case in which the data stored in the local caches LC1 and LC5 are erased thereafter, there is a problem in that it is difficult to restore the erased data.

A method of switching the CMs 110 and 120 from the write-back operation to the write-through operation in the case in which the battery 240 does not work is also taken into consideration. According to this method, it is possible to reduce the possibility that the data of the local caches LC1 and LC5 are erased. However, this method has problems in that response speeds of accessing the LUs in the CMs 110, 120, 210, and 220 are deteriorated and the access performance of the entire storage system is significantly deteriorated.

According to the second embodiment, in a case in which the battery 240 does not work, CMs serving as the assignment destinations of the local caches LC2 and LC6 are switched to CMs in another CE. In addition, CMs serving as the assignment destinations of the mirror caches MC1 and MC5 are also switched to CMs in yet another CE. In the CMs to which the local caches LC2 and LC6 are newly assigned, the write-back operation is continued. Therefore, it is possible to improve access performance compared to the method in which operations of the CMs serving as the assignment destinations of the local caches and the mirror caches are changed to the write-through operation without changing the assignment destinations.

Figure 5:
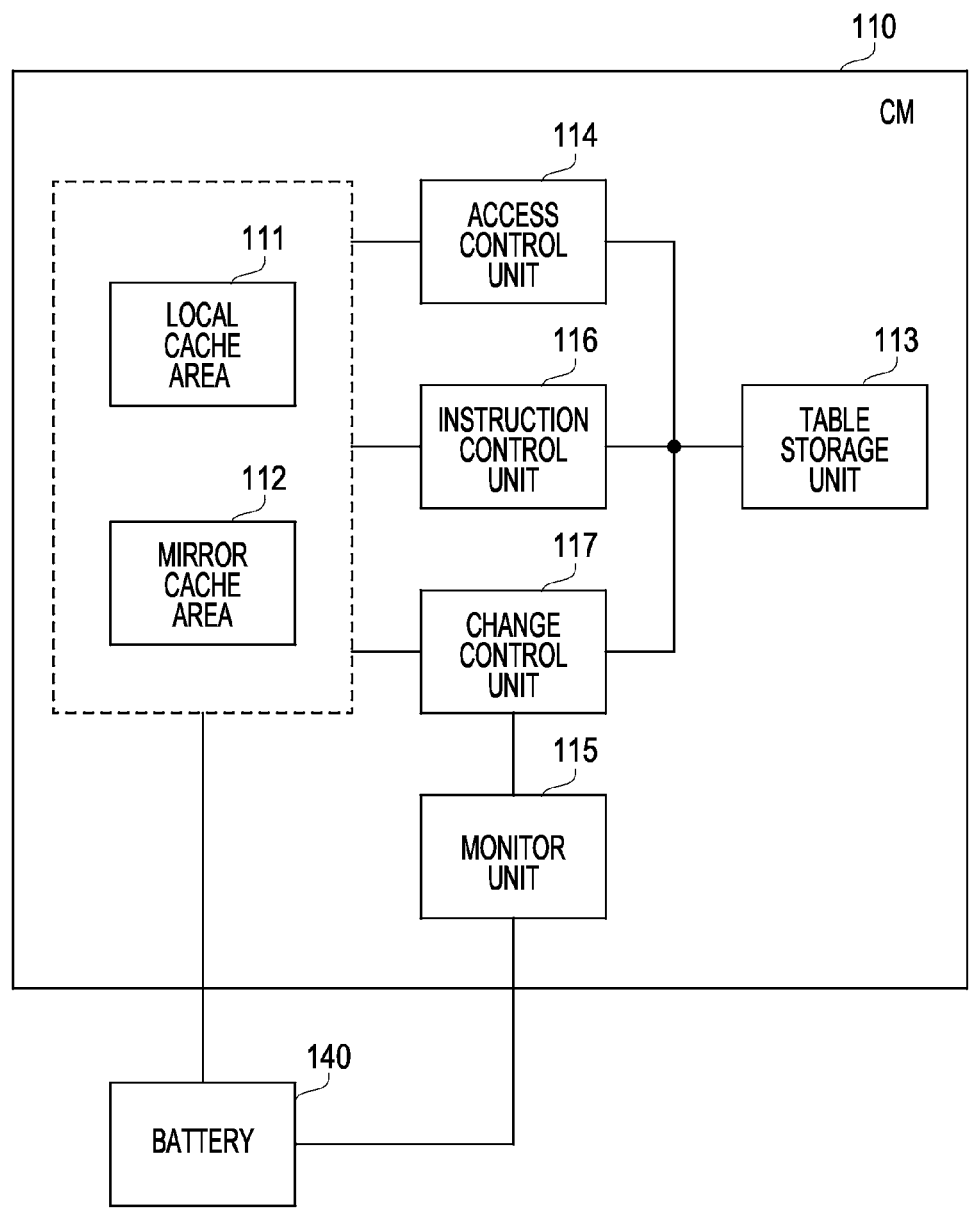
FIG. 5 is a diagram illustrating an exemplary functional configuration of a CM.

FIG. 5 is a diagram illustrating an exemplary functional configuration of the CM. The CM 110 includes a local cache area 111, a mirror cache area 112, a table storage unit 113, an access control unit 114, a monitor unit 115, an instruction control unit 116, and a change control unit 117. The table storage unit 113 is implemented as a storage area which is secured in, for example, the RAM 110b or the SSD 110c. The access control unit 114, the monitor unit 115, the instruction control unit 116, and the change control unit 117 are implemented, for example, when the processor 110a executes installed program modules.

The local cache area 111 and the mirror cache area 112 are storage areas which are secured in the RAM 110b. One or more local caches, which are respectively corresponding to LUs, may be assigned to the local cache area 111, and one or more mirror caches, which are respectively corresponding to the LUs, may be assigned to the mirror cache area 112.

The table storage unit 113 stores therein a volume management table. In the volume management table, pieces of information, which indicate assignment destination CMs of the local caches and the mirror caches for the respective LUs in the initial state and a current state, respectively, are registered.

In a case in which the CM 110 is set as a master CM which will be described later, the table storage unit 113 also stores therein a configuration management table. In the configuration management table, pieces of information, which indicate the interrelation between the CMs 110, 120, 210, 220, 310, 320, 410, and 420, are registered. A fact that the CMs 110, 120, 210, 220, 310, 320, 410, and 420 are cyclically arranged is defined using the configuration management table. In addition, as will be described later, the master CM may identify CMs (assignment change destinations) which are to newly serve as the assignment destinations of the local caches and the mirror caches corresponding to the LUs using the configuration management table.

Furthermore, the table storage unit 113 stores therein information which indicates the correspondence relationship between each battery and each CE. For example, the table storage unit 113 stores therein information indicative of the correspondence relationship between the battery 240 and the CE 200. The master CM may identify a fact that the CE 200 includes the battery 240 on the basis of this information.

The access control unit 114 performs access control on an LU in response to an access request received from the host device 900. In a case of the access control, the access control unit 114 uses an area, which is assigned as a local cache corresponding to the LU that is requested to access, of the local cache area 111 as a cache area. The access control unit 114 may switch between the write-back method and the write-through method as a method of performing the write control on the LUs.

For example, in a case in which the local cache LC1 corresponding to LUN#1 is assigned to the local cache area 111 and write to LUN#1 is controlled through the write-back method, the following process is performed. In a case in which the access control unit 114 receives a request for writing data in LUN#1 from the host device 900, the access control unit 114 stores the received write data in the local cache LC1 of the local cache area 111. In addition, the access control unit 114 copies the write data which is stored in the local cache LC1 and transmits the copied data to the CM 210, and requests the CM 210 to write the copied data to the mirror cache MC1 of the CM 210. The copied data is transmitted to the CM 210 through the switch 1000. When the copied data is written in the mirror cache MC1, the write data received from the host device 900 is duplicated in the local cache LC1 and the mirror cache MC1. When the duplication is completed, the access control unit 114 provides, to the host device 900, a notification that the write data is completely written. Thereafter, the access control unit 114 stores the write data, which is stored in the local cache area 111, to an HDD corresponding to LUN#1 at predetermined timing.

In contrast, in a case in which the local cache LC1 corresponding to LUN#1 is assigned to the local cache area 111 and the write to LUN#1 is controlled through the write-through method, the following process is performed. When a request for writing data in LUN#1 is received from the host device 900, the access control unit 114 writes the received write data in the local cache LC1 of the local cache area 111 and writes the write data in the HDD corresponding to LUN#1. After the access control unit 114 stores the write data in the local cache LC1 and the HDD, the access control unit 114 provides, to the host device 900, a notification that the write data is completely written. In a case in which the write-through method is used, the write data is stored in the non-volatile storage device at a point of time in which the access control unit 114 responds to the host device 900, and thus the copied write data is not written in the mirror cache MC1.

In addition, in response to a request received from the CM 420, the access control unit 114 stores mirror data, which is transmitted from the CM 420 and corresponds to the local cache of the CM 420, in the mirror cache area 112.

The monitor unit 115 monitors the state of the battery 140. The monitor unit 115 operates only in a case in which the CM 110 is set as an in-CE master which will be described later.

The instruction control unit 116 instructs the change control unit 117 and another CM to operate. The instruction control unit 116 operates only in a case in which the CM 110 is set as the master CM.

The change control unit 117 performs control according to an instruction received from the instruction control unit of the master CM. In a case in which the CM 110 is set as the master CM, the change control unit 117 performs control according to an instruction received from the instruction control unit 116 of the CM 110.

For example, the change control unit 117 transmits data stored in the local cache area 111 or the mirror cache area 112 to another CM in accordance with an instruction received from the instruction control unit of the master CM. The change control unit 117 instructs the access control unit 114 to switch the write control of the LUs to the write-back method or the write-through method in accordance with an instruction received from the instruction control unit of the master CM.

The CMs 120, 210, 220, 310, 320, 410, and 420 each include a local cache area, a mirror cache area, a table storage unit, an access control unit, a monitor unit, an instruction control unit, and a change control unit similarly to the CM 110. Since each of the functions is similar to that of the CM 110, the description thereof will not be repeated.

The in-CE master and the master CM will be described. One CM among CMs of each CE is set as the in-CE master. The in-CE master monitors operational states of the CMs in the CE, and transmits results of monitoring to the master CM. In addition, one CM among the CMs 110, 120, 210, 220, 310, 320, 410, and 420 is set as the master CM. The master CM controls the operations of the CMs in the storage system on the basis of the results of monitoring which are received from the in-CE masters. One CM may be set as both the in-CE master and the master CM.

The functions of the in-CE master will be described. The functions of the in-CE master are realized by the monitor unit of the CM which is set as the in-CE master. Here, description will be given while it is assumed that the CM 110 is set as the in-CE master. The monitor unit 115 monitors the state of the battery 140. For example, monitor unit 115 regularly performs polling for the battery 140, to monitor the state of the battery 140. In a case in which the monitor unit 115 detects that the battery 140 is abnormal, the monitor unit 115 sends a battery abnormality notification, which indicates that the battery 140 is abnormal, to the master CM. The abnormality of the battery 140 refers to, for example, a case in which the battery 140 does not work or a case in which the charging rate of the battery 140 is smaller than a threshold. Information indicative of which CM is the master CM is stored in the table storage unit of the CM which is set as the in-CE master. In a case in which the monitor unit 115 detects that the battery 140 becomes normal, the monitor unit 115 transmits a battery normality notification which indicates that the battery 140 is normal to the master CM.

Subsequently, the functions of the master CM will be described. The functions of the master CM are realized by the instruction control unit of the CM which is set as the master CM. Here, description will be given while it is assumed that the CM 110 is set as the master CM.

In a case in which the instruction control unit 116 receives a battery abnormality notification or a battery normality notification from an in-CE master, the instruction control unit 116 determines whether or not the number of abnormal batteries among the batteries in the storage system is equal to or larger than a predetermined threshold. For example, the threshold is set to a number indicating that the number of remaining normal batteries among the batteries in the storage system is one. Information indicative of the predetermined threshold is stored in the table storage unit 113. In a case in which the number of abnormal batteries is smaller than the predetermined threshold, the instruction control unit 116 performs an assignment change process. In contrast, in a case in which the number of abnormal batteries is equal to or larger than the predetermined threshold, the instruction control unit 116 performs an operation switch process.

In the assignment change process, the instruction control unit 116 outputs, with reference to the configuration management table, an assignment change instruction for assigning a local cache, which has been assigned to a CM in the CE in which the abnormality of the battery has occurred, to another CM to both the assignment destination CM before the assignment change and the assignment destination CM after the assignment change. The assignment change instruction includes an instruction for transmitting the data of the local cache from the assignment destination CM before the assignment change to the assignment destination CM after the assignment change.

The instruction control unit 116 also outputs, with reference to the configuration management table, an assignment change instruction for assigning a mirror cache, which has been assigned to a CM in the CE in which the abnormality of the battery has occurred, to another CM to both the assignment destination CM before the assignment change and the assignment destination CM after the assignment change.

In the operation switch process, the instruction control unit 116 returns the assignment destination CM of the local cache, for which the assignment destination has been changed, to the initial state. The instruction control unit 116 instructs a CM in the CE, in which the battery abnormality has occurred, to switch the write control (that is, write control using the local cache used for the access control) of the LUs controlled by the CM to the write-through method. In a case in which the battery of a CE, which includes a CM corresponding to the mirroring destination of the local cache, is abnormal, the instruction control unit 116 instructs the CM, which includes the local cache, to switch the write control of the LUs to the write-through method.

FIG. 6 is a diagram illustrating an example of the volume management table. A volume management table 113a is stored in the table storage unit 113. In addition, volume management tables, which have identical contents as in the volume management table 113a, are stored in respective table storage units of all of the other CMs 120, 220, 310, 320, 410, and 420. That is, the contents of the volume management tables are synchronized in all of the CMs 110, 120, 210, 220, 310, 320, 410, and 420.

The volume management table 113a has records for the respective LUs. Each record of the volume management table 113a includes items of a LUN, a redundant array of inexpensive disks (RAID) level, a physical storage area, a local cache, and a mirror cache. The items of the local cache and the mirror cache are provided for each of the initial state and the current state.

In the item of the LUN, information which identifies an LU of the record is registered. In the item of the RAID level, an RAID level which is used for access control of an LU is registered. In the item of the physical storage area, information indicative of physical storage areas which are assigned to the LU is registered. For example, in the item of the physical storage area, pieces of identification information of HDDs which are assigned to the LU are registered. In the item of the physical storage area, address ranges indicative of areas in the assigned HDDs may be registered.

In the items of the local cache and the mirror cache corresponding to the initial state, pieces of identification information of the CMs, to which the local cache and the mirror cache corresponding to the LU in the initial state are assigned, are registered. In the items of the local cache and the mirror cache corresponding to the current state, pieces of identification information of the CMs, to which the local cache and the mirror cache corresponding to the LU at current point of time are assigned, are registered. The items of the local cache and the mirror cache corresponding to the current state are updated whenever the assignment destination CMs are changed.

In the description below, it is assumed that pieces of information which identify the CMs 110, 210, 310, 410, 120, 220, 320, and 420 are "CM#1", "CM#2", "CM#3", "CM#4", "CM#5", "CM#6", "CM#7", and "CM#8", respectively. The pieces of information which are registered in the items of the local cache and the mirror cache corresponding to the initial state in FIG. 6 express the state illustrated in FIG. 4.

FIG. 7 is a diagram illustrating an example of the configuration management table. A configuration management table 113b is stored in the table storage unit of the master CM. For example, the configuration management table 113b is stored in the table storage unit 113 of the CM 110 which is set as the master CM. The configuration management table 113b may be stored in the table storage units of the CMs other than the master CM in a state of being synchronized. The reason for this is that, in a case in which the master CM does not work, a CM which stores therein the configuration management table 113b may operate as the master CM.

The configuration management table 113b has records for the respective CMs. Each record of the configuration management table 113b includes items of a CE identifier (ID), a CM ID, a Backward CM, and a Forward CM. In the item of the CE ID, information which identifies a CE is registered. In the item of the CM ID, information which identifies a CM of the record is registered. In the item of the Backward CM, an ID of a CM, which mirrors data of the local cache to the mirror cache of the CM of the record, is registered. In the item of the Forward CM, an ID of a mirroring destination CM of data, which is stored in the local cache of the CM of the record, is registered.

For example, in the second record of the configuration management table 113b illustrated in FIG. 7, "CE#2" is registered in the item of the CE ID, "CM#2" is registered in the item of the CM ID, "CM#1" is registered in the item of the Backward CM, and "CM#3" is registered in the item of the Forward CM. This record indicates that the mirroring destination of the local cache of the CM 110 (CM#1) is the CM 210 (CM#2) of the CE 200 (CE#2). This record also indicates that the mirroring source of the mirror cache of the CM 310 (CM#3) is the CM 210 (CM#2) of the CE 200 (CE#2).

A fact that the CMs 110, 120, 210, 220, 310, 320, 410, and 420 are cyclically arranged is defined by the pieces of information which are registered in the items of the CM ID, the Backward CM, and the Forward CM of the configuration management table 113*b*. The configuration management table 113*b* illustrated in FIG. 7 indicates the interrelation between the CMs in the initial state illustrated in FIG. 4. That is, the setting is defined such that the CMs are arranged in order from the CM 110 to the CM 210, from the CM 210 to the CM 310, from the CM 310 to the CM 410, from the CM 410 to the CM 120, from the CM 120 to the CM 220, from the CM 220 to the CM 320, from the CM 320 to the CM 420, and from the CM 420 to the CM 110. The Backward CM indicates a back-side CM in the arrangement direction, and the Forward CM indicates a front-side (that is, subsequent) CM in the arrangement direction.

In a case in which the instruction control unit 116 excludes a certain CM from the cyclic arrangement, the instruction control unit 116 updates the configuration management table 113*b*. In addition, in a case in which the instruction control unit 116 changes the assignment destinations of the local cache and the mirror cache which have been assigned to the certain CM, the instruction control unit 116 may determine the assignment destinations on the basis of the configuration management table 113*b*.

Subsequently, a process performed in a case in which an abnormality of a battery has occurred will be described with a specific example.

First, an example of processes, which is performed in a case in which an abnormality has occurred in the battery 240 of the CE 200 in the initial state of FIG. 4, will be described with reference to FIGS. 8 to 11. In the description below, the initial state is referred to as a "first state", and a state acquired after the processes in response to the occurrence of the abnormality of the battery 240 are completed is referred to as a "second state". It is assumed that the CMs 110, 210, 310, and 410 are set as the in-CE masters and the CM 110 is set as the master CM.

Figure 8:
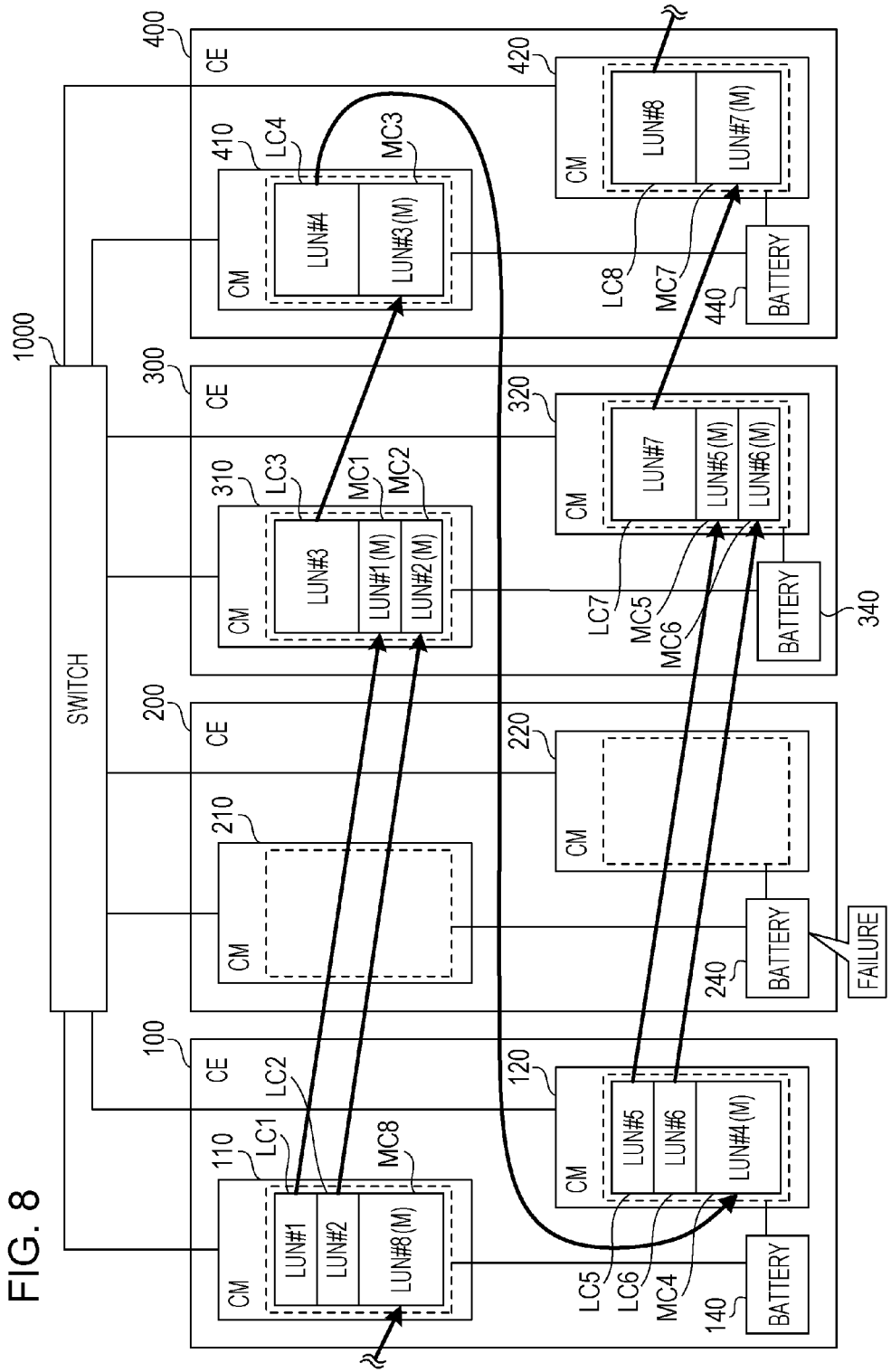
FIG. 8 is a diagram illustrating an assignment state of local caches and mirror caches in a second state.

FIG. 8 is a diagram illustrating the assignment state of the local caches and the mirror caches in the second state. When the CM 210, which is the in-CE master in the CE 200, detects that an abnormality of the battery 240 has occurred in the first state, the CM 210 notifies the CM 110, which is the master CM, of the fact that the abnormality of the battery 240 has occurred. The CM 110 determines whether or not the number of CEs which have abnormal batteries is equal to or larger than a predetermined threshold. Here, it is assumed that the threshold is "2". Since the number of CEs which have abnormal batteries is "1", the CM 11 determines that the number of CEs which have abnormal batteries is smaller than the predetermined threshold. In this case, the CM 110 performs the assignment change process in order to assign the local caches and the mirror caches, which have been assigned to the CMs 210 and 220 in the CE 200, to other CMs.

As illustrated in FIG. 4, at a point of time in which the occurrence of the abnormality of the battery 240 is detected, the local cache LC2 and the mirror cache MC1 are assigned to the CM 210, and the local cache LC6 and the mirror cache MC5 are assigned to the CM 220. With the assignment change process performed by the CM 110, the assignment destination CMs are changed as follows.

The assignment destinations of the local caches LC2 and LC6 are changed from the current CMs to CMs which are on the back sides in the cyclic arrangement. Specifically, as illustrated in FIG. 8, the assignment destination of the local cache LC2 is changed from the CM 210 to the CM 110 and the assignment destination of the local cache LC6 is changed from the CM 220 to the CM 120.

In contrast, the assignment destinations of the mirror caches MC1 and MC5 are changed from the current CMs to CMs which are on the front sides in the cyclic arrangement. Specifically, as illustrated in FIG. 8, the assignment destination of the mirror cache MC1 is changed from the CM 210 to the CM 310, and the assignment destination of the mirror cache MC5 is changed from the CM 220 to the CM 320.

After the assignment is changed as described above, the operation of the storage system is restarted. At this time, the CM 110 performs access control to LUN#2 using the local cache LC2 in addition to the access control to LUN#1 using the local cache LC1. The write control to LUN#1 and LUN#2 is performed through the write-back method. In addition, the CM 110 mirrors the data of the local cache LC2 to the mirror cache MC2 which is assigned to the CM 310.

Abnormalities have not occurred in both the battery 140 which is coupled to the CM 110 and the battery 340 which is coupled to the CM 310. Therefore, even though the CM 110 controls the write to LUN#2 using the local cache LC2 through the write-back method, the possibility that the data of LUN#2 is erased is not changed from the first state before it is detected that the battery 240 does not work. Therefore, in a case in which assignment is changed as in FIG. 8, it is possible to improve the speed of accessing LUN#1 and LUN#2, compared to the method of switching the CM 210 to the write-through operation while the local cache LC2 and the mirror cache MC1 are still assigned to the CM 210.

When the assignment is changed as illustrated in FIG. 8 and the operation of the storage system is restarted, the CM 120 performs access control to LUN#6 using the local cache LC6 in addition to the access control to LUN#5 using the local cache LC5. The write control to LUN#5 and LUN#6 is performed through the write-back method. In addition, the CM 120 mirrors the data of the local cache LC6 to the mirror cache MC6 which is assigned to the CM 320. Therefore, it is possible to improve the speed of accessing LUN#5 and LUN#6, compared to the method of switching the CM 220 to the write-through operation while the local cache LC6 and the mirror cache MC5 are still assigned to the CM 220.

In the second state, an access request to LUN#2 from the host device 900 is received by the CM 210 similarly to the first state. When the CM 210 receives the access request to LUN#2 from the host device 900, the CM 210 transmits the access request to the CM 110. The CM 110 performs access control to LUN#2 in response to the transmitted access request. An access control completion response is transmitted from the CM 110 to the host device 900 through the CM 210. Similarly, the access request to LUN#5 from the host device 900 is received by the CM 220 and is transmitted to the CM 120.

The CMs 210 and 220, in which the assignment of the local caches and the mirror caches is released, continuously function as access paths for the DE 600 which is coupled to the CMs 210 and 220. For example, it is assumed that an HDD of the DE 600 is assigned as a physical storage area of LUN#2. In the second state, in a case in which the CM 110 stores the data of the local cache LC2 in the HDD of the DE 600, the CM 110 transmits a request for writing data in the HDD of the DE 600 and the write data to the CM 210. The CM 210 writes the received write data in the HDD of the DE 600.

In the present embodiment, it is assumed that the sizes of areas, which are used as the local caches and the mirror caches, respectively, in the RAMs of the respective CMs are fixed. Therefore, in a case in which the assignment change as illustrated in FIG. 8 is performed, the capacities of the local caches LC1, LC2, LC5, and LC6 are changed to ½ thereof. In the respective local caches LC1, LC2, LC5, and LC6, for example, data amounting to ½ of the capacities thereof may remain in order of the latest access time from the latest, and the other data is evacuated to relevant physical storage areas.

Figure 9:
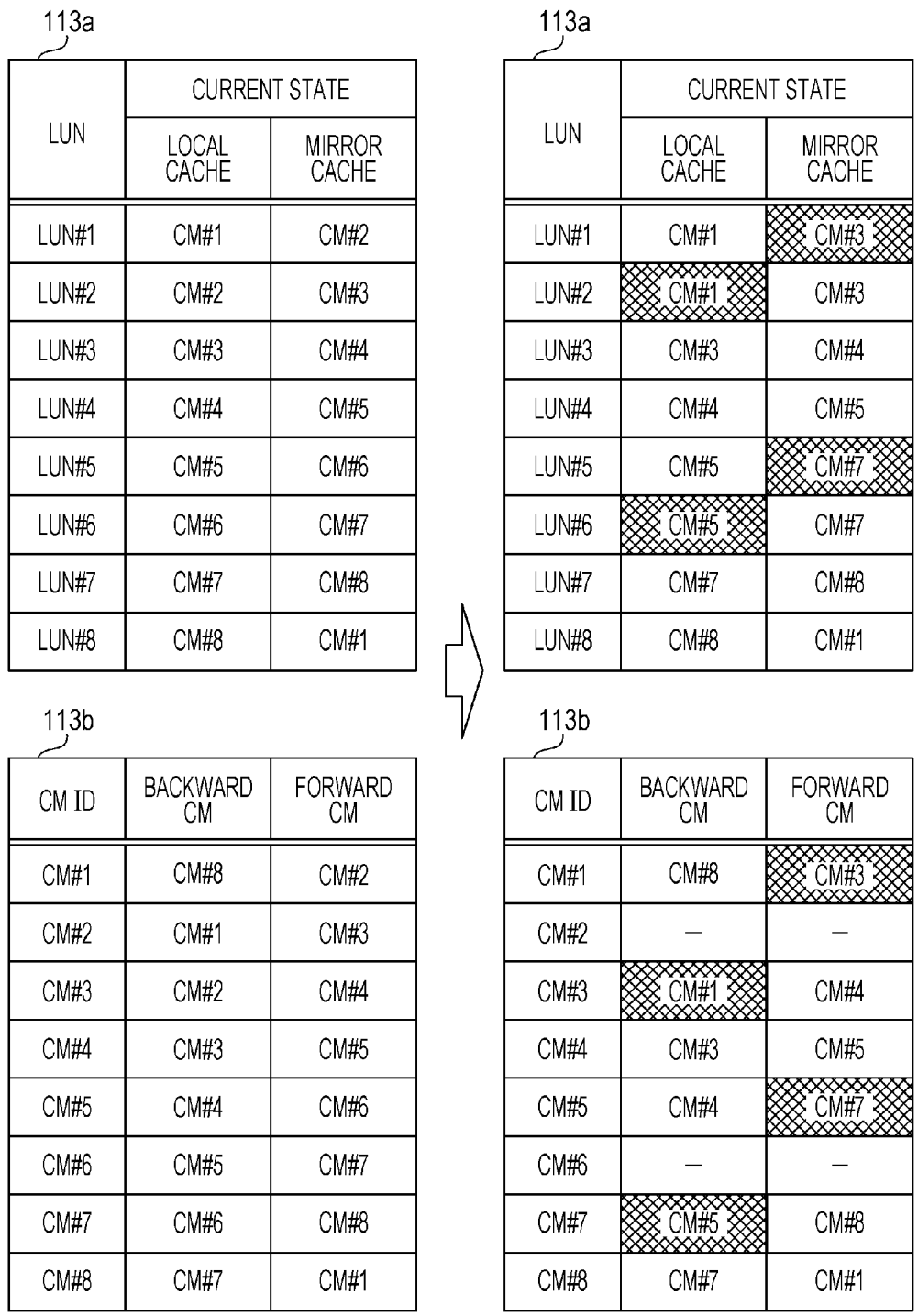
FIG. 9 is a diagram illustrating changes in tables when an assignment state of local caches and mirror caches is transitioned from a first state to a second state.

FIG. 9 is a diagram illustrating the changes in the tables when the assignment state of the local caches and the mirror caches is transitioned from the first state to the second state. In the volume management table 113*a* and the configuration management table 113*b* in the second state on the right side of FIG. 9, the identification numbers of the changed CMs are illustrated by applying shading.

The instruction control unit 116 of the CM 110, which is the master CM, determines how to change the assignment of the local caches and the mirror caches by performing processes as follow.

The instruction control unit 116 identifies the assignment change destinations of the local caches and the mirror caches which have been assigned to the CM 210 (CM#2) and the CM 220 (CM#6) in the CE 200, respectively, on the basis of the configuration management table 113*b* in the first state illustrated in the left side of FIG. 9. Specifically, the instruction control unit 116 identifies the assignment change destination of the local cache LC2 of LUN#2, which has been assigned to CM#2, as CM#1 which is registered in the item of the Backward CM in the record of CM#2. The instruction control unit 116 also identifies the assignment change destination of the mirror cache MC1 of LUN#1, which has been assigned to CM#2, as CM#3 which is registered in the item of the Forward CM in the record of CM#2. In addition, the instruction control unit 116 identifies the assignment change destination of the local cache LC6 of LUN#6, which has been assigned to CM#6, as CM#5 which is registered in the item of the Backward CM in the record of CM#6. The instruction control unit 116 also identifies the assignment change destination of the mirror cache MC5 of LUN#5, which is assigned to CM#6, as CM#7 which is registered in the item of the Forward CM in the record of CM#6.

The instruction control unit 116 updates the volume management table 113*a* such that the change in the assignment destinations is reflected after performing control (described later) in order to change the assignment destinations of the local caches and the mirror caches as described above.

Furthermore, the instruction control unit 116 updates the configuration management table 113*b* to exclude the CM 210 (CM#2) and the CM 220 (CM#6) from the cyclic arrangement. Specifically, the instruction control unit 116 changes the Forward CM corresponding to CM#1 on the back side of CM#2 from CM#2 to CM#3 on the front side of CM#2 on the basis of the configuration management table 113*b* in the first state. The instruction control unit 116 also changes the Backward CM corresponding to CM#3 on the front side of CM#2 from CM#2 to CM#1 on the back side of CM#2 on the basis of the configuration management table 113*b* in the first state. In addition, the instruction control unit 116 erases information in the respective items of the Backward CM and the Forward CM corresponding to CM#2.

Figure 10:
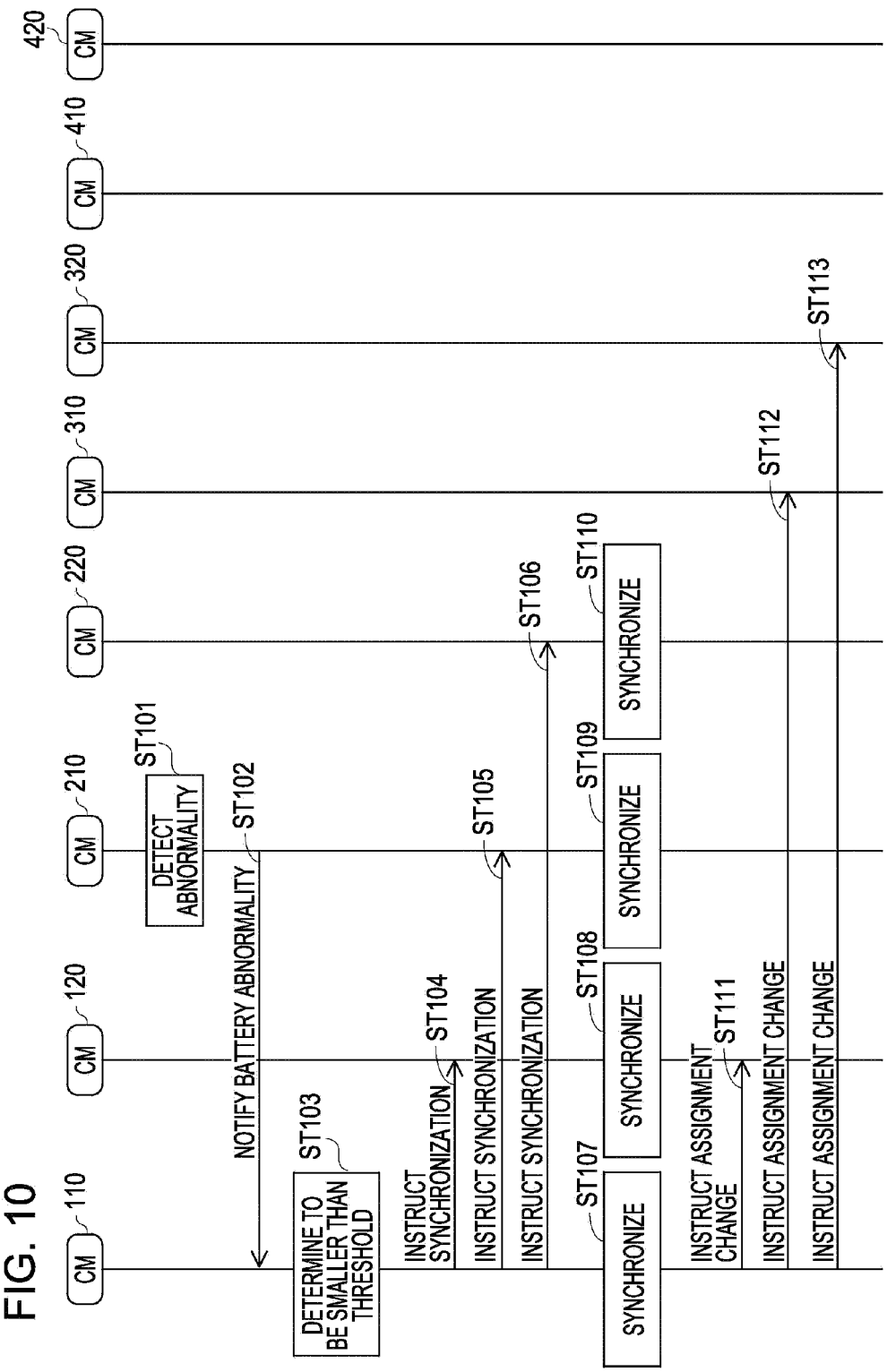
FIG. 10 is a sequence diagram illustrating an example of processes performed when an assignment state of local caches and mirror caches is transitioned from a first state to a second state.
Figure 11:
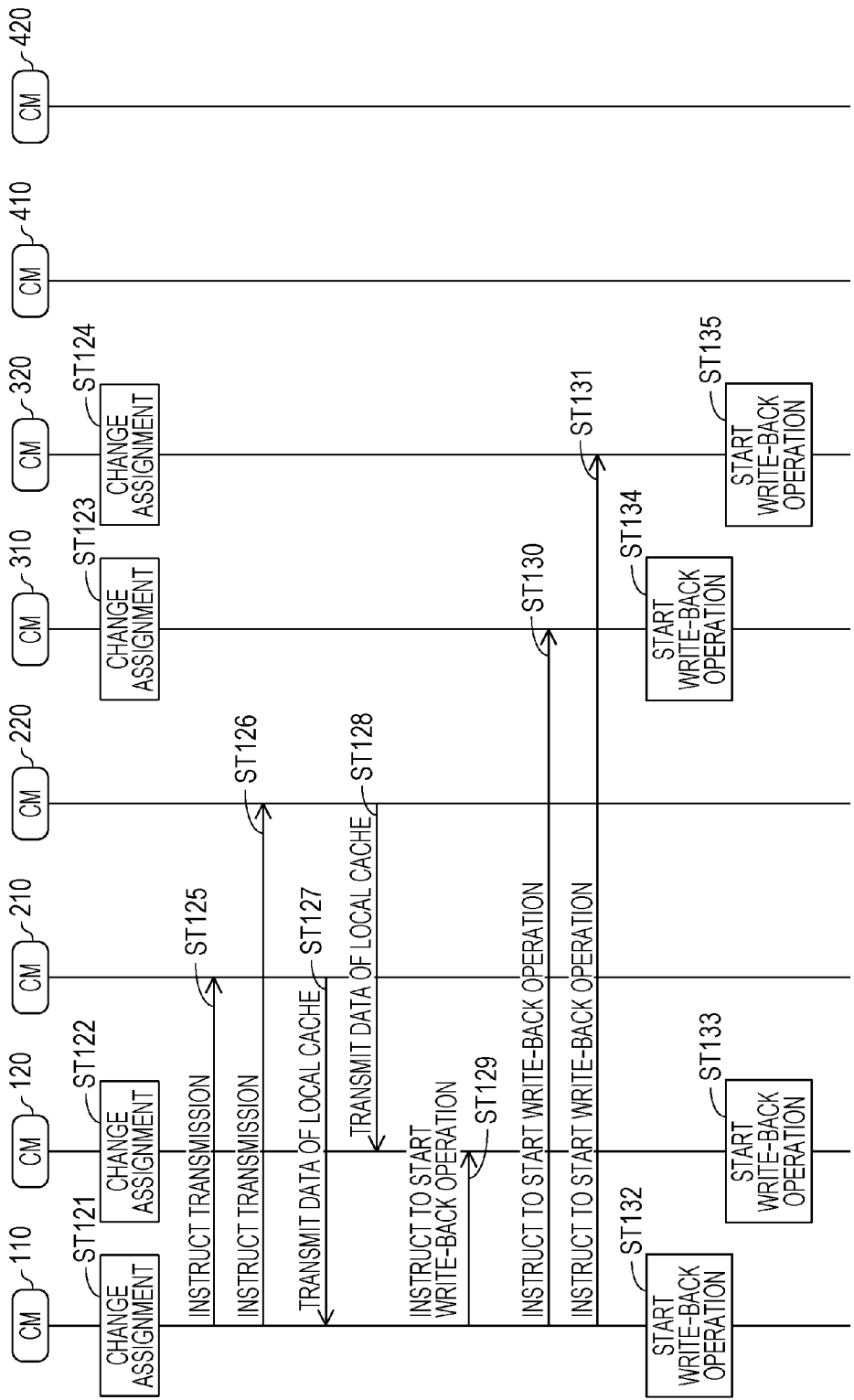
FIG. 11 is a sequence diagram illustrating an example of processes performed when an assignment state of local caches and mirror caches is transitioned from a first state to a second state.

FIGS. 10 and 11 are sequence diagrams illustrating an example of processes performed when the assignment state of the local caches and the mirror caches is transitioned from the first state to the second state. Hereinafter, the processes illustrated in FIGS. 10 and 11 will be described.

(ST101) In the first state, the monitor unit of the CM 210 detects that the battery 240 is abnormal. For example, the monitor unit of the CM 210 detects that the battery 240 does not work.

(ST102) The monitor unit of the CM 210 transmits a battery abnormality notification, which indicates a fact that the battery 240 is abnormal, to the CM 110.

(ST103) The monitor unit 115 of the CM 110 receives the battery abnormality notification. The monitor unit 115 of the CM 110 determines whether or not the number of abnormal batteries among the batteries in the storage system is equal to or larger than a predetermined threshold. Here, it is assumed that the predetermined threshold is set to "2". The monitor unit 115 of the CM 110 determines that the number of abnormal batteries is smaller than the predetermined threshold.

Subsequently, the instruction control unit 116 of the CM 110 identifies CMs to be synchronized with regard to the local caches thereof with the physical storage areas, with reference to the configuration management table 113*b*. Specifically, the instruction control unit 116 of the CM 110 identifies the CMs 210 and 220 in the CE 200 which has an abnormal battery, and the CMs 110 and 120, which mirror the data of the local caches thereof to the CMs 210 and 220, as the CMs to be synchronized. The CMs 110 and 120, of which the data of the local caches are mirrored to the CMs 210 and 220, are identified as CMs located on the back sides of the CMs 210 and 220 in the cyclic arrangement.

(ST104) The instruction control unit 116 of the CM 110 instructs the CM 120 to synchronize data stored in the local cache LC5.

(ST105) The instruction control unit 116 of the CM 110 instructs the CM 210 to synchronize data stored in the local cache LC2.

(ST106) The instruction control unit 116 of the CM 110 instructs the CM 220 to synchronize data stored in the local cache LC6.

(ST107) The instruction control unit 116 of the CM 110 instructs the change control unit 117 of the CM 110 to synchronize data stored in the local cache LC1. The change control unit 117 of the CM 110 writes data, which is not yet stored in the physical storage area among the data stored in the local cache LC1, in the physical storage area to synchronize the local cache LC1 with the physical storage area.

(ST108) The change control unit of the CM 120 writes data, which is not yet stored in the physical storage area among the data stored in the local cache LC5, in the physical storage area to synchronize the local cache LC5 with the physical storage area.

(ST109) The change control unit of the CM 210 writes data, which is not yet stored in the physical storage area among the data stored in the local cache LC2, in the physical storage area to synchronize the local cache LC2 with the physical storage area.

(ST110) The change control unit of the CM 220 writes data, which is not yet stored in the physical storage area among the data stored in the local cache LC6, in the physical storage area to synchronize the local cache LC2 with the physical storage area.

The instruction control unit 116 of the CM 110 determines how to change the assignment of the local cache and the mirror cache with reference to the configuration management table 113b. The procedure of the determination process is described above with reference to FIG. 9. The instruction control unit 116 of the CM 110 identifies the assignment change destination of the local cache LC2 of LUN#2, which has been assigned to the CM 210, as the CM 110. The instruction control unit 116 of the CM 110 also identifies the assignment change destination of the mirror cache MC1 of LUN#1, which has been assigned to the CM 210, as the CM 310. In addition, the instruction control unit 116 of the CM 110 identifies the assignment change destination of the local cache LC6 of LUN#6, which has been assigned to the CM 220, as the CM 120. The instruction control unit 116 also identifies the assignment change destination of the mirror cache MC5 of LUN#5, which has been assigned to the CM 220, as the CM 320. The above-described procedure of the determination process may be performed at any timing after the process in ST103 is performed until the process in ST111 is performed.

(ST111) The instruction control unit 116 of the CM 110 transmits an assignment change instruction, which indicates that the local cache LC6 of LUN#6 is to be newly assigned, to the CM 120.

(ST112) The instruction control unit 116 of the CM 110 transmits an assignment change instruction, which indicates that the mirror cache MC1 of LUN#1 is to be newly assigned, to the CM 310.

(ST113) The instruction control unit 116 of the CM 110 transmits an assignment change instruction, which indicates that the mirror cache MC5 of LUN#5 is to be newly assigned, to the CM 320.

(ST121) The instruction control unit 116 of the CM 110 transmits an assignment change instruction, which indicates that the local cache LC2 of LUN#2 is to be newly assigned, to the change control unit 117 of the CM 110. The change control unit 117 of the CM 110 changes the assignment of the local caches in accordance with the assignment change instruction.

Specifically, the change control unit 117 of the CM 110 newly secures the respective areas of the local cache LC1 of LUN#1 and the local cache LC2 of LUN#2 in the local cache area 111 of the RAM 110b. At this time, the change control unit 117 of the CM 110 migrates a portion of the data of the existing local cache LC1 secured in the RAM 110b to the newly secured area of the local cache LC1. The portion amounts to ½ of the capacity of the existing local cache LC1, in order of the latest access time from the latest.

(ST122) The change control unit of the CM 120 changes the assignment of the local caches. Specifically, the change control unit of the CM 120 newly secures the respective areas of the local cache LC5 of LUN#5 and the local cache LC6 of LUN#6 in the local cache area of the RAM of the CM 120. At this time, the change control unit of the CM 120 migrates a portion of the data of the existing local cache LC5 secured in the RAM of the CM 120 to the newly secured area of the local cache LC5. The portion of the data amounts to ½ of the capacity of the existing local cache LC5, in order of the latest access time from the latest.

In the present embodiment, in the RAM of each of the CMs, the sizes of areas to be used as the local cache and the mirror cache are fixed. However, as another example, in the RAM of each of the CMs, the size of an area to be used as both the local cache and the mirror cache may be fixed. The fixed size of the storage area of the RAM may be equally divided to the local caches and the mirror caches which are assigned to one CM. In this case, the amount of data to be transmitted in ST127 (ST128) is determined in ST125 (ST126) on the basis of the total number of local caches and mirror caches which are assigned to the CM 110 (CM 120).

(ST123) The change control unit of the CM 310 changes the assignment of the mirror caches. Specifically, the change control unit of the CM 310 newly secures the respective areas of the mirror cache MC2 of LUN#2 and the mirror cache MC1 of LUN#1 in the mirror cache area of the RAM of CM 310.

(ST124) The change control unit of the CM 320 changes the assignment of the mirror caches. Specifically, the change control unit of the CM 320 newly secures the respective areas of the mirror cache MC6 of LUN#6 and the mirror cache MC5 of LUN#5 in the mirror cache area of the RAM of CM 320.

When the processes in ST121 to ST124 are completed, the following processes are performed.

(ST125) The instruction control unit 116 of the CM 110 instructs the CM 210 to transmit data of the local cache LC2 of LUN#2, which is assigned to the RAM of CM 210, to the CM 110. At this time, the instruction control unit 116 of the CM 110 instructs to transmit data amounting to ½ of the capacity of the local cache LC2 in the current state.

(ST126) The instruction control unit 116 of the CM 110 instructs the CM 220 to transmit data of the local cache LC6 of LUN#6, which is assigned to the RAM of CM 220, to the CM 120. At this time, the instruction control unit 116 of the CM 110 instructs to transmit data amounting to ½ of the capacity of the local cache LC6 in the current state.

(ST127) The change control unit of the CM 210 transmits data, which amounts to ½ of the capacity in order of the latest access time from the latest, among the data stored in the local cache LC2 of LUN#2 to the CM 110. Thus, the transmitted data is stored in the area of the local cache LC2 which is secured in the CM 110.

(ST128) The change control unit of the CM 220 transmits data, which amounts to ½ of the capacity in order of the latest access time from the latest, among the data stored in the local cache LC6 of LUN#6 to the CM 120. Thus, the transmitted data is stored in the area of the local cache LC6 which is secured in the CM 120.

When the processes in ST127 and ST128 are completed, the following processes are performed.

(ST129) The instruction control unit 116 of the CM 110 instructs the CM 120 to start the write-back operation.

(ST130) The instruction control unit 116 of the CM 110 instructs the CM 310 to start the write-back operation.

(ST131) The instruction control unit 116 of the CM 110 instructs the CM 320 to start the write-back operation.

(ST132) The instruction control unit 116 of the CM 110 instructs the access control unit 114 of the CM 110 to start the write-back operation. The access control unit 114 of the CM 110 starts the write-back operation. At this time, the access control unit 114 of the CM 110 copies the data of the local caches LC1 and LC2 to the mirror caches MC1 and MC2 of the CM 310, respectively. When the copy is completed, the access control unit 114 of the CM 110 starts access control to LUN#1 using the local cache LC1 and access control to LUN#2 using the local cache LC2. In the access control, the data of the local caches LC1 and LC2 are mirrored to the mirror caches MC1 and MC2 of the CM 310, respectively. The write control to LUN#1 and LUN#2 is performed through the write-back method.

(ST133) The access control unit of the CM 120 starts the write-back operation. At this time, the access control unit of the CM 120 copies the data of the local caches LC5 and LC6 to the mirror caches MC5 and MC6 of the CM 320, respectively. When the copy is completed, the access control unit of the CM 120 starts access control to LUN#5 using the local cache LC5 and access control to LUN#6 using the local cache LC6. In the access control, the data of the local caches LC5 and LC6 are mirrored to the mirror caches MC5 and MC6 of the CM 320, respectively. The write control to LUN#5 and LUN#6 is performed through the write-back method.

(ST134) The access control unit of the CM 310 starts the write-back operation. That is, the access control unit of the CM 310 restarts the access control to LUN#3 using the local cache LC3. The write control to LUN#3 is performed through the write-back method.

(ST135) The access control unit of the CM 320 starts the write-back operation. That is, the access control unit of the CM 320 restarts the access control to LUN#7 using the local cache LC7. The write control to LUN#7 is performed through the write-back method.

Subsequently, an example of processes performed in a case in which an abnormality has occurred in the battery 340 of the CE 300 at the second state will be described with reference to FIGS. 12 to 16. In the description below, a state acquired after the processes in response to the occurrence of the abnormality of the battery 340 are completed is described as a "third state".

Figure 12:
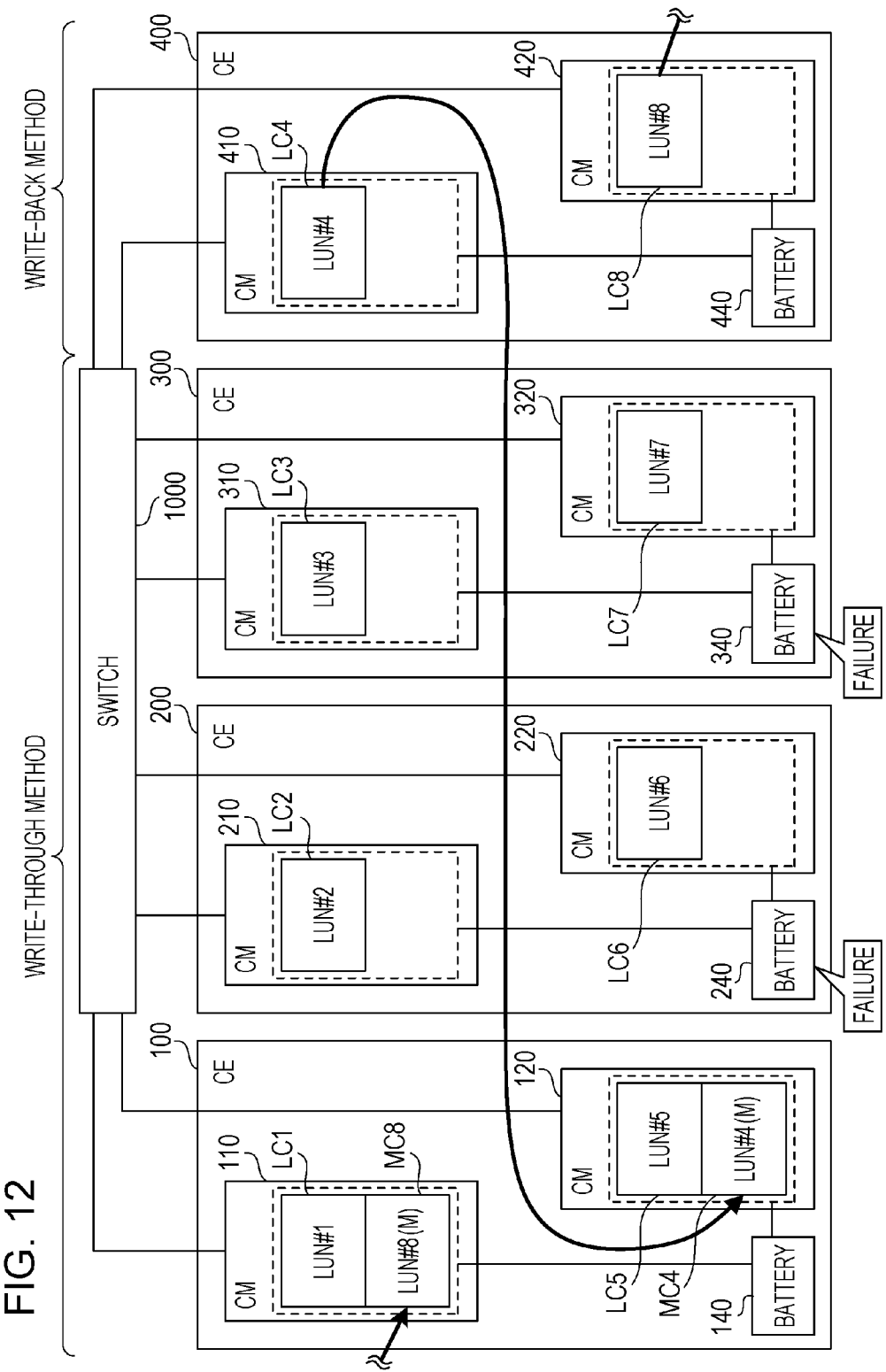
FIG. 12 is a diagram illustrating an assignment state of local caches and mirror caches in a third state.

FIG. 12 is a diagram illustrating an assignment state of the local caches and the mirror caches in the third state. When the CM 310, which is the in-CE master in the CE 300, detects that an abnormality of the battery 340 has occurred in the second state, the CM 310 notifies the CM 110, which is the master CM, of the fact that the abnormality of the battery 340 has occurred. The CM 110 determines whether or not the number of CEs which have abnormal batteries is equal to or larger than the predetermined threshold. Here, the CM 110 determines that the number of CEs which have abnormal batteries is equal to the predetermined threshold of "2". In this case, the CM 110 performs the operation switch process as follows. In the operation switch process, the CM 110 returns the assignment of the CMs 110, 120, 210, 220, 310, and 320, in which the assignment of the local caches or the mirror caches are changed from the initial state, to the initial state. Furthermore, the CM 110 switches the operation method of the CMs 110, 120, 210, 220, 310, and 320 from the write-back operation to the write-through operation.

The assignment destination CMs of the local cache are changed as in FIG. 12. That is, the assignment destination of the local cache LC2 of LUN#2 is changed from the CM 110 to the CM 210. The assignment destination of the local cache LC6 of LUN#6 is changed from the CM 120 to the CM 220.

Furthermore, the operation method of the CMs 110, 120, 210, 220, 310, and 320 is changed from the write-back operation to the write-through operation. That is, the CM 110 controls the write to LUN#1 using the local cache LC1 through the write-through method. The CM 120 controls the write to LUN#5 using the local cache LC5 through the write-through method. The CM 210 controls the write to LUN#2 using the local cache LC2 through the write-through method. The CM 220 controls the write to LUN#6 using the local cache LC6 through the write-through method. The CM 310 controls the write to LUN#3 using the local cache LC3 through the write-through method. The CM 320 controls the write to LUN#7 using the local cache LC7 through the write-through method.

With such an assignment change process, it is possible to reduce the possibility that the data of LUN#1, LUN#2, LUN#3, LUN#5, LUN#6, and LUN#7 are erased.

Since the write is controlled through the write-through method, the necessity of mirroring the data of the local caches corresponding to LUN#1, LUN#2, LUN#3, LUN#5, LUN#6, and LUN#7, respectively, to the mirror caches is low. Therefore, as illustrated in FIG. 12, the mirror caches MC1, MC2, MC3, MC5, MC6, and MC7 corresponding to LUN#1, LUN#2, LUN#3, LUN#5, LUN#6, and LUN#7, respectively are not assigned to the CMs.

Figure 13:
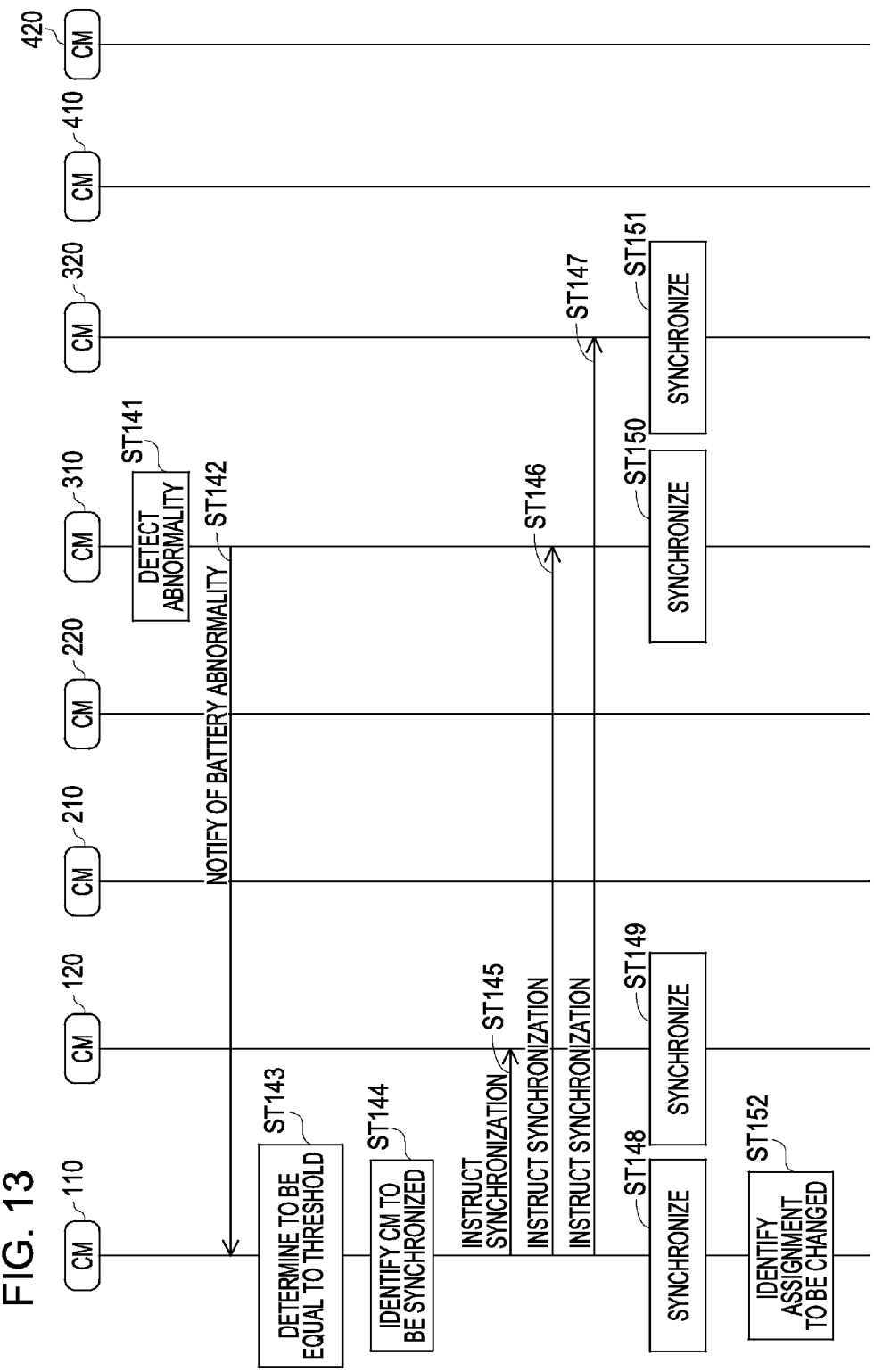
FIG. 13 is a sequence diagram illustrating an example of processes performed when an assignment state of local caches and mirror caches is transitioned from a second state to a third state.
Figure 14:
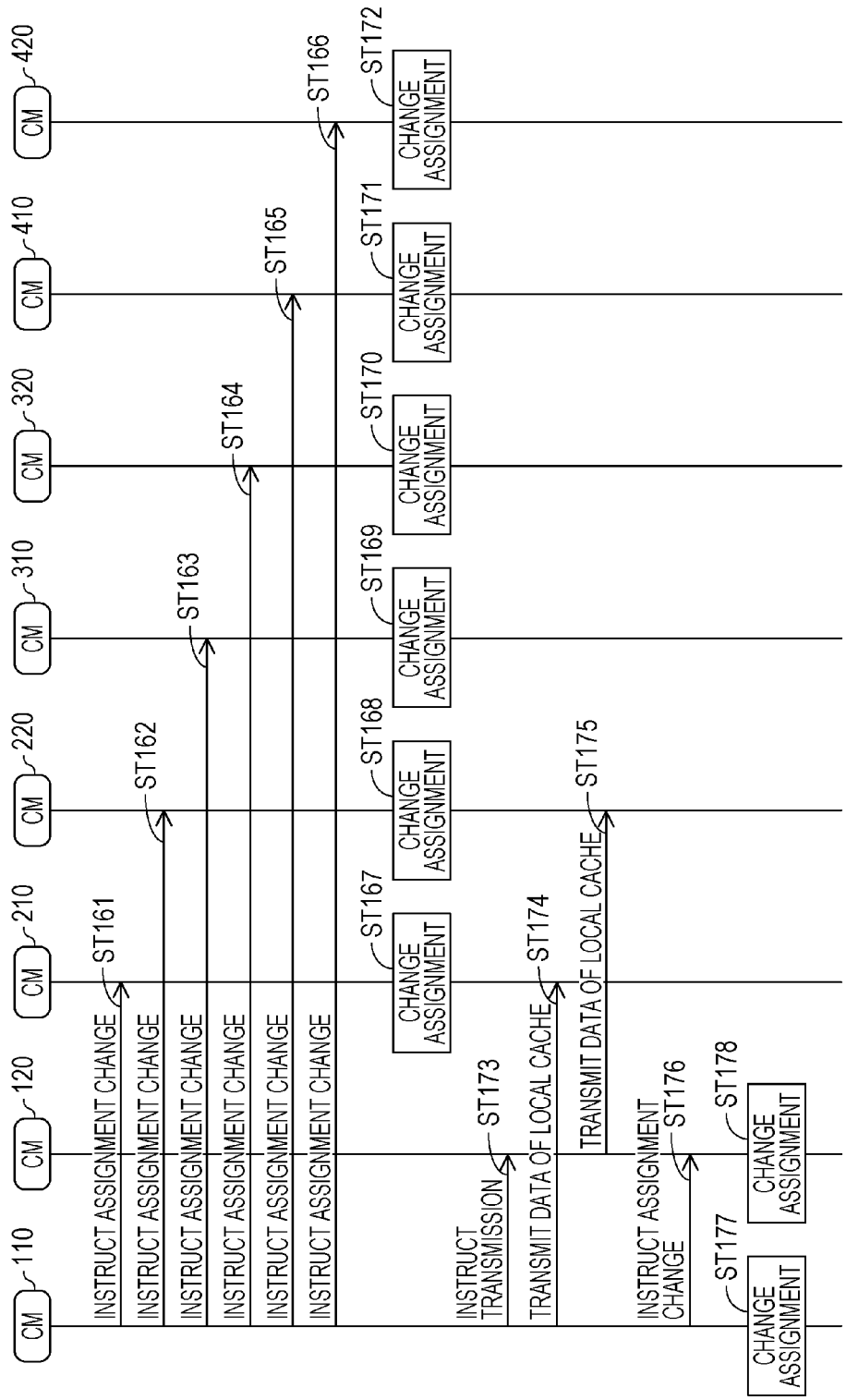
FIG. 14 is a sequence diagram illustrating an example of processes performed when an assignment state of local caches and mirror caches is transitioned from a second state to a third state.
Figure 15:
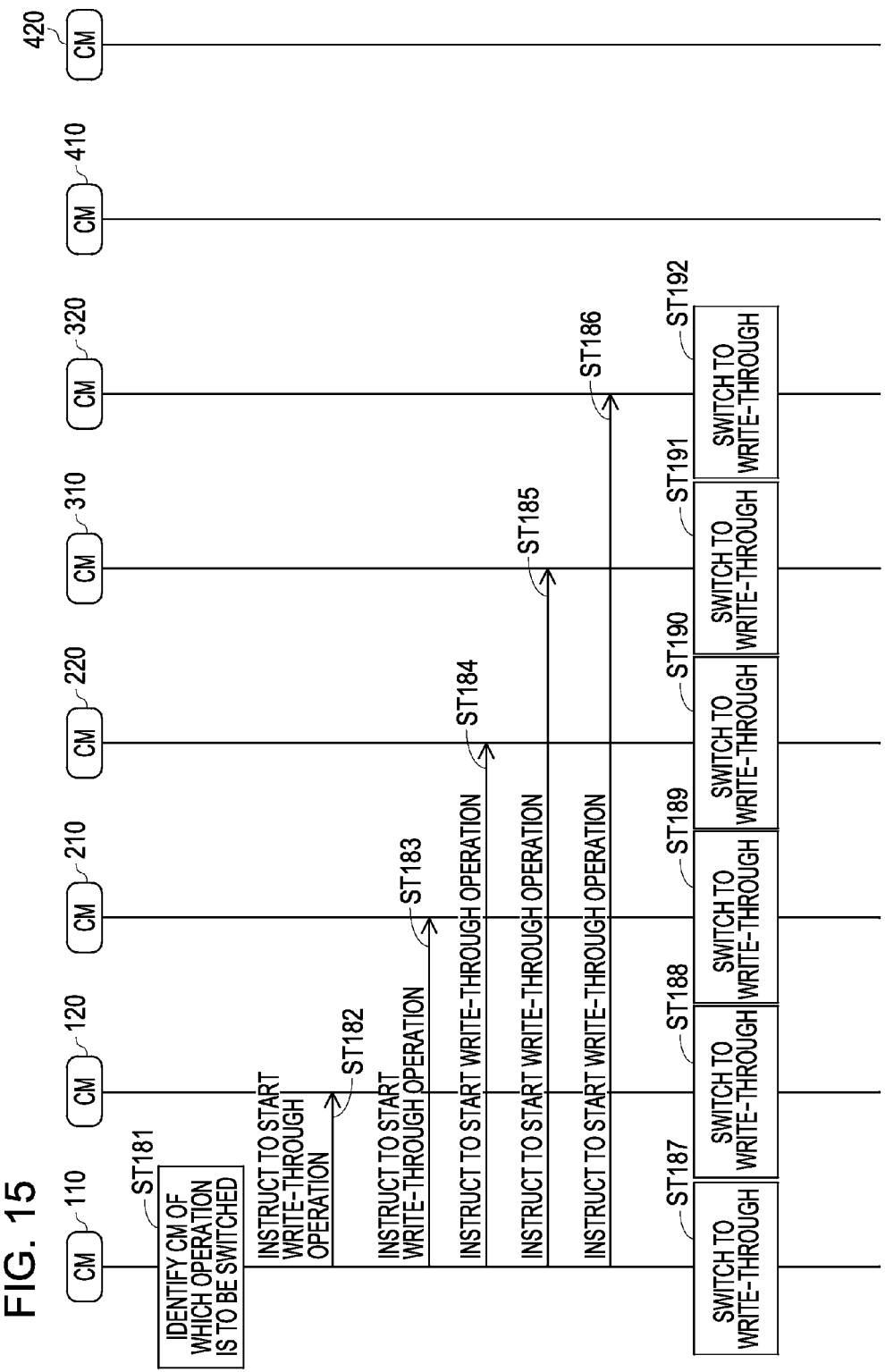
FIG. 15 is a sequence diagram illustrating an example of processes performed when an assignment state of local caches and mirror caches is transitioned from a second state to a third state.

FIGS. 13 to 15 are sequence diagrams illustrating an example of processes performed when the assignment state of the local caches and the mirror caches is transitioned from the second state to the third state. Hereinafter, the processes illustrated in FIGS. 13 to 15 will be described.

(ST141) In the second state, the monitor unit of the CM 310 detects that the battery 340 is abnormal. For example, the monitor unit of the CM 310 detects that the battery 340 does not work.

(ST142) The monitor unit of the CM 310 transmits a battery abnormality notification, which indicates a fact that the battery 340 is abnormal, to the CM 110.

(ST143) The monitor unit 115 of the CM 110 receives the battery abnormality notification. The monitor unit 115 of the CM 110 determines whether or not the number of abnormal batteries among the batteries in the storage system is equal to or larger than the predetermined threshold of "2". The monitor unit 115 of the CM 110 determines that the number of abnormal batteries is equal to the predetermined threshold of "2".

(ST144) The instruction control unit 116 of the CM 110 identifies CMs to be synchronized with regard to the local caches thereof with the physical storage areas. The instruction control unit 116 of the CM 110, first, identifies the CM 310 (CM#3) and the CM 320 (CM#7) in the CE 300, in which the abnormality of the battery 340 is detected in ST141, as the CMs to be synchronized.

Furthermore, the instruction control unit 116 of the CM 110 identifies CMs which mirror the data of the local caches thereof to the identified CM 310 (CM#3) and CM 320 (CM#7) on the basis of the volume management table 113a. Specifically, the instruction control unit 116 of the CM 110 identifies records, in which the identified CM 310 (CM#3) and CM 320 (CM#7) are registered, in the items of the mirror caches corresponding to the current state from the volume management table 113a. Here, the respective records of LUN#1, LUN#2, LUN#5, and LUN#6 are identified. The instruction control unit 116 of the CM 110 identifies CMs, which are registered in the items of the local caches corresponding to the current state, of the items of the identified records as the CMs to be synchronized. Here, CM#1 and CM#5 are identified.

(ST145) The instruction control unit 116 of the CM 110 instructs the CM 120 (CM#5) to synchronize data stored in the local caches LC5 and LC6.

(ST146) The instruction control unit 116 of the CM 110 instructs the CM 310 (CM#3) to synchronize data stored in the local cache LC3.

(ST147) The instruction control unit 116 of the CM 110 instructs the CM 320 (CM#7) to synchronize data which is stored in the local cache LC7.

(ST148) The instruction control unit 116 of the CM 110 instructs the change control unit 117 of the CM 110 to synchronize data stored in the local caches LC1 and LC2. The change control unit 117 of the CM 110 writes data, which is not yet stored in the physical storage areas among the data stored in the local caches LC1 and LC2, in the physical storage areas to synchronize the local caches LC1 and LC2 with the physical storage areas.

(ST149) The change control unit of the CM 120 writes data, which is not yet stored in the physical storage areas among the data stored in the local caches LC5 and LC6, in the physical storage areas to synchronize the local caches LC5 and LC6 with the physical storage areas.

(ST150) The change control unit of the CM 310 writes data, which is not yet stored in the physical storage area among the data stored in the local cache LC3, in the physical storage area to synchronize the local cache LC3 with the physical storage area.

(ST151) The change control unit of the CM 320 writes data, which is not yet stored in the physical storage area among the data stored in the local cache LC7, in the physical storage area to synchronize the local cache LC7 with the physical storage area.

When the processes in ST148 to ST151 are completed, the following processes are performed.

(ST152) The instruction control unit 116 of the CM 110 determines details of change in the assignment of the local caches. Specifically, the instruction control unit 116 of the CM 110 compares the item of the local cache corresponding to the initial state and the item of the local cache corresponding to the current state with reference to the volume management table 113a. The instruction control unit 116 of the CM 110 identifies records of LUs which have mismatched registered contents. In the example of FIG. 12, the respective records of LUN#2 and LUN#6 are identified. The instruction control unit 116 of the CM 110 identifies CMs for which the assignment of the local caches is to be changed on the basis of the items of the local caches, which respectively correspond to the current state and the initial state, in the identified records. In the example of FIG. 12, it is determined that the assignment destination of the local cache LC2 of LUN#2 is to be changed from the CM 110 (CM#1) to the CM 210 (CM#2) and that the assignment destination of the local cache LC6 of LUN#6 is to be changed from the CM 120 (CM#5) to the CM 220 (CM#6).

In addition, the instruction control unit 116 of the CM 110 identifies CMs for which the assignment of the mirror caches is to be changed. The CMs to be identified are CMs to which the mirror caches are not assigned. Specifically, the CMs to be identified include CMs in the CEs which have abnormal batteries, and CMs which are located, in the cyclic arrangement, on the front sides of the CMs in the CEs which have abnormal batteries. In the example of FIG. 12, CMs 210, 220, 310, and 320 are identified as the former, and the CMs 310, 320, 410, and 420 are identified as the latter.

In FIG. 14, on the basis of the process in ST152 of FIG. 13, first, an assignment change instruction is transmitted to the CMs to which a local cache is newly assigned and CMs to which a mirror cache is not assigned.

(ST161) The instruction control unit 116 of the CM 110 transmits an assignment change instruction, which indicates that the local cache LC2 of LUN#2 is to be newly assigned, to the CM 210.

(ST162) The instruction control unit 116 of the CM 110 transmits an assignment change instruction, which indicates that the local cache LC6 of LUN#6 is to be newly assigned, to the CM 220.

(ST163) The instruction control unit 116 of the CM 110 transmits an assignment change instruction, which indicates that a mirror cache is not assigned, to the CM 310.

(ST164) The instruction control unit 116 of the CM 110 transmits an assignment change instruction, which indicates that a mirror cache is not assigned, to the CM 320.

(ST165) The instruction control unit 116 of the CM 110 transmits an assignment change instruction, which indicates that a mirror cache is not assigned, to the CM 410.

(ST166) The instruction control unit 116 of the CM 110 transmits an assignment change instruction, which indicates that a mirror cache is not assigned, to the CM 420.

The assignment changes are performed in ST167 to ST172 as follows in accordance with the assignment change instructions transmitted in ST161 to ST166.

(ST167) The change control unit of the CM 210 secures an area of the local cache LC2 of LUN#2 in the local cache area of the RAM of the CM 210.

(ST168) The change control unit of the CM 220 secures an area of the local cache LC6 of LUN#6 in the local cache area of the RAM of the CM 220.

(ST169) The change control unit of the CM 310 erases the data of the mirror caches MC1 and MC2, and releases the assignment of the mirror caches MC1 and MC2.

(ST170) The change control unit of the CM 320 erases the data of the mirror caches MC5 and MC6, and releases the assignment of the mirror caches MC5 and MC6.

(ST171) The change control unit of the CM 410 erases the data of the mirror cache MC3, and releases the assignment of the mirror cache MC3.

(ST172) The change control unit of the CM 420 erases the data of the mirror cache MC7, and releases the assignment of the mirror cache MC7.

When at least the processes in ST167 and ST168 are completed, the following processes are performed.

(ST173) The instruction control unit 116 of the CM 110 instructs the CM 120 to transmit the data of the local cache LC6 of LUN#6 to the CM 220.

(ST174) The instruction control unit 116 of the CM 110 instructs the change control unit 117 of the CM 110 to transmit the data of the local cache LC2 of LUN#2 to the CM 210. The change control unit 117 of the CM 110 transmits the data of the local cache LC2 to the CM 210.

(ST175) The change control unit of the CM 120 transmits the data of the local cache LC6 of LUN#6 to the CM 220.

When the processes in ST174 and ST175 are completed, the following processes are performed.

(ST176) The instruction control unit 116 of the CM 110 transmits an assignment change instruction, which indicates that the assignment of the local cache LC6 is to be released, to the CM 120.

(ST177) The instruction control unit 116 of the CM 110 instructs the change control unit 117 of the CM 110 to release the assignment of the local cache LC2. The change control unit 117 of the CM 110 erases the data of the local cache LC2, and releases the assignment of the local cache LC2. The change control unit 117 of the CM 110 enlarges the area of the local cache LC1 to the entire local cache area on the RAM.

(ST178) The change control unit of the CM 120 erases the data of the local cache LC6, and releases the assignment of the local cache LC6. The change control unit of the CM 120 enlarges the area of the local cache LC5 to the entire local cache area on the RAM.

(ST181) The instruction control unit 116 of the CM 110 identifies CMs of which the operation method is to be switched to the write-through operation. The CMs include CMs in the CEs which have abnormal batteries, and CMs which are located, in the cyclic arrangement, on the back sides of the CMs in the CEs which have abnormal batteries. In the example of FIG. 14, the CMs 210, 220, 310, and 320 are identified as the former, and the CMs 110, 120, 210, and 220 are identified as the latter.

(ST182) The instruction control unit 116 of the CM 110 instructs the CM 120 to start the write-through operation.

(ST183) The instruction control unit 116 of the CM 110 instructs the CM 210 to start the write-through operation.

(ST184) The instruction control unit 116 of the CM 110 instructs the CM 220 to start the write-through operation.

(ST185) The instruction control unit 116 of the CM 110 instructs the CM 310 to start the write-through operation.

(ST186) The instruction control unit 116 of the CM 110 instructs the CM 320 to start the write-through operation.

(ST187) The instruction control unit 116 of the CM 110 instructs the access control unit 114 of the CM 110 to start the write-through operation. The access control unit 114 of the CM 110 starts the access control to the local cache LC1 through the write-through operation. At this time, the access control unit 114 of the CM 110 controls the write to the local cache LC1 through the write-through method.

(ST188) The access control unit of the CM 120 starts the access control to the local cache LC5 through the write-through operation. At this time, the access control unit of the CM 120 controls the write to the local cache LC5 through the write-through method.

(ST189) The access control unit of the CM 210 starts the access control to the local cache LC2 through the write-through operation. At this time, the access control unit of the CM 210 controls the write to the local cache LC2 through the write-through method.

(ST190) The access control unit of the CM 220 starts the access control to the local cache LC6 through the write-through operation. At this time, the access control unit of the CM 220 controls the write to the local cache LC6 through the write-through method.

(ST191) The access control unit of the CM 310 starts the access control to the local cache LC3 through the write-through operation. At this time, the access control unit of the CM 310 controls the write to the local cache LC3 through the write-through method.

(ST192) The access control unit of the CM 320 starts the access control to the local cache LC7 through the write-through operation. At this time, the access control unit of the CM 320 controls the write to the local cache LC7 through the write-through method.

FIG. 16 is a diagram illustrating the changes in the tables when the assignment state of the local caches and the mirror caches is transitioned from the second state to the third state. After the processes of FIG. 15 are completed, the volume management table 113a and the configuration management table 113b are updated as follows. In the volume management table 113a and the configuration management table 113b in the third state on the right side of FIG. 16, the identification numbers of the changed CMs are illustrated by applying shading.

The instruction control unit 116 of the CM 110 returns the assignment destination CMs of the local cache and the mirror cache which correspond to the current state in the volume management table 113a to the initial state on the basis of the items of the local cache and the mirror cache which correspond to the initial state in the volume management table 113a (refer to FIG. 6). Thus, the volume management table 113a is updated as illustrated at the upper right of FIG. 16.

In the volume management table 113a which is illustrated at the upper right of FIG. 16, the assignment destination CMs of mirror caches, which are not actually used, are written in parentheses. In the actual process, for example, in the third state, contents registered in the items corresponding to the current state in the volume management table 113a are identical to the contents registered in the items corresponding to the initial state. Therefore, in a case in which any one of batteries in which the abnormality has occurred is replaced with a normal battery, it is possible to identify assignment change destination CMs of the local cache and the mirror cache with reference to the volume management table 113a without change. In the third state, the assignment destination CMs of the mirror caches, which are not actually used, may be managed separately from the volume management table 113a.

The instruction control unit 116 also updates the configuration management table 113b. The update is performed such that CMs which have blank fields for the Backward CM and the Forward CM in the configuration management table 113b are inserted again into the cyclic arrangement. Therefore, the configuration management table 113b is updated to be the same state as the initial state, as illustrated at the lower right of FIG. 16.

Subsequently, processes performed by CMs will be described with reference to flowcharts.

Figure 17:
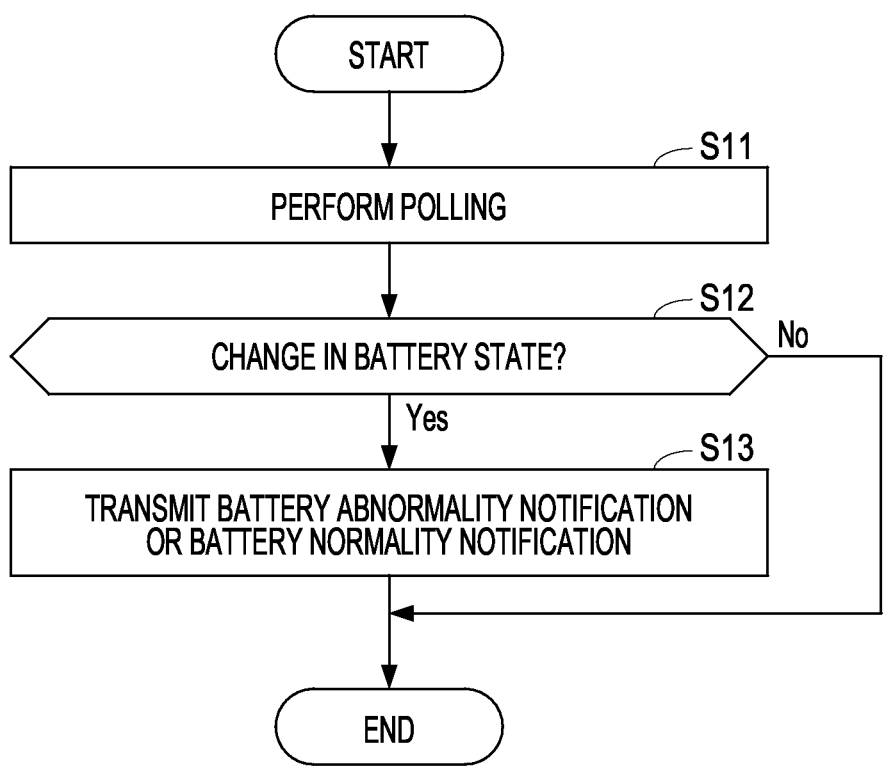
FIG. 17 is a flowchart illustrating an example of a battery state monitor process performed by an in-CE master.

FIG. 17 is a flowchart illustrating an example of a battery state monitor process performed by an in-CE master. In FIG. 17, it is assumed that the CM 110 is set as the in-CE master. Hereinafter, the process illustrated in FIG. 17 will be described. The process of FIG. 17 is performed at regular intervals.

(S11) The monitor unit 115 performs polling on the battery 140.

(S12) The monitor unit 115 determines whether or not the state of the battery 140 has changed from a normal state to an abnormal state or from an abnormal state to a normal state. For example, in a case in which the battery 140 does not work or the charging rate of the battery 140 is smaller than a predetermined threshold, the monitor unit 115 determines that the battery 140 is in an abnormal state. In a case in which the state of the battery 140 is changed, the process proceeds to S13. In a case in which the state of the battery 140 is not changed, the process ends.

(S13) The monitor unit 115 transmits a notification which indicates the state of the battery 140 to the master CM. In a case in which it is determined that the battery 140 has changed to the abnormal state in S12, the monitor unit 115 transmits a battery abnormality notification that indicates that the battery 140 is abnormal. In a case in which it is determined that the battery 140 has changed to the normal state in S12, the monitor unit 115 transmits a battery normality notification which indicates that the battery 140 is normal. Thereafter, the process ends.

In a case in which the CM 110 is set as the master CM, the battery abnormality notification or the battery normality notification is notified to the instruction control unit 116 of the CM 110 in S13.

Figure 18:
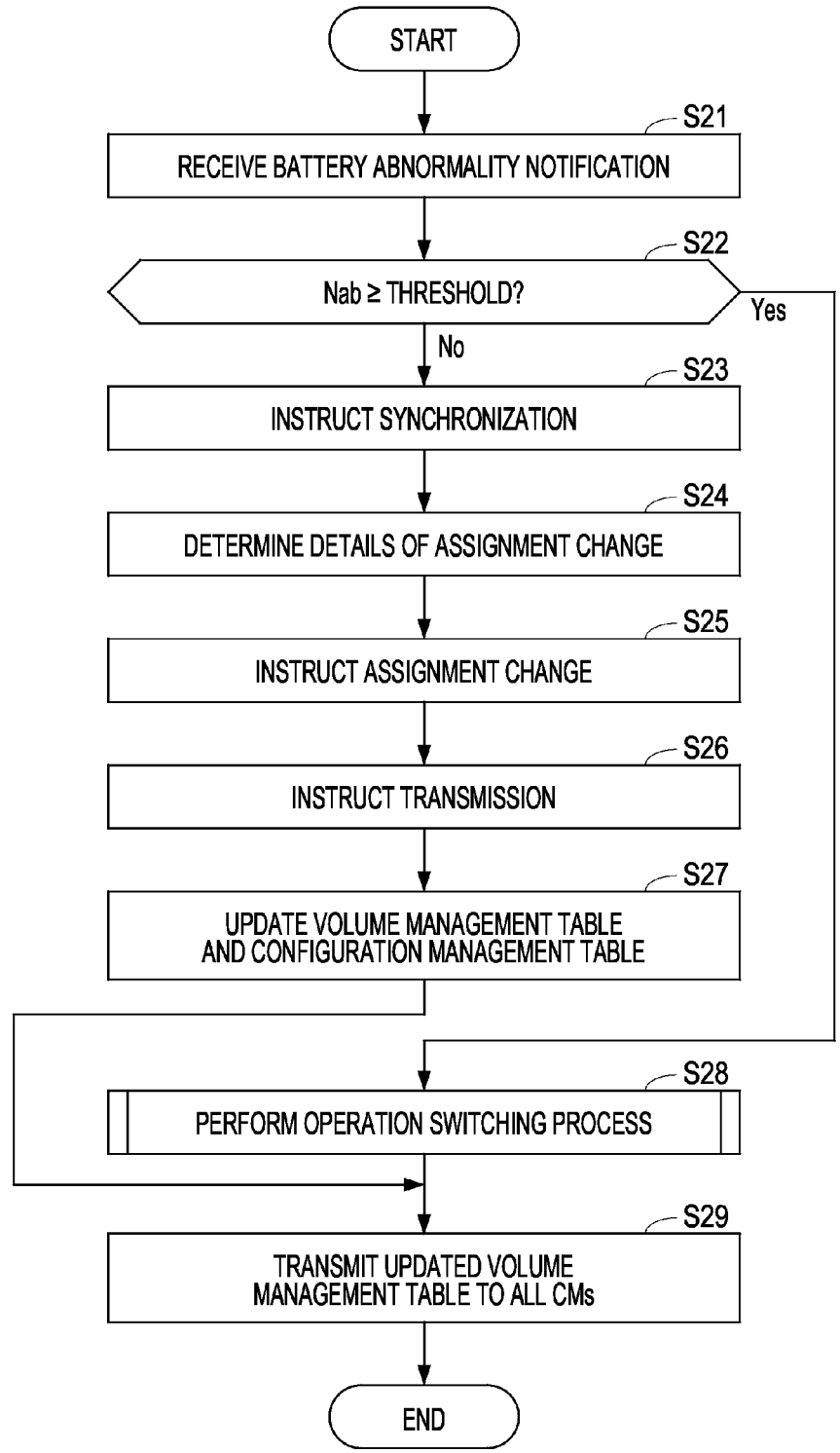
FIG. 18 is a flowchart illustrating an example of processes performed by a master CM upon receiving a battery abnormality notification.

FIG. 18 is a flowchart illustrating an example of processes performed by the master CM upon receiving the battery abnormality notification. In FIG. 18, it is assumed that the CM 110 is set as the master CM. Hereinafter, the processes illustrated in FIG. 18 will be described.

(S21) The instruction control unit 116 receives a battery abnormality notification from an in-CE master. The battery abnormality notification includes information indicative of which battery is abnormal. There is a case in which the instruction control unit 116 receives the battery abnormality notification from the monitor unit 115 of the CM 110.

(S22) The instruction control unit 116 determines whether or not the number $N_{ab}$ of abnormal batteries among the batteries in the storage system is equal to or larger than a predetermined threshold. In a case in which the number $N_{ab}$ of abnormal batteries is equal to or larger than the predetermined threshold, the process proceeds to S28. In a case in which the number $N_{ab}$ of abnormal batteries is smaller than the predetermined threshold, the process proceeds to S23. In S23, the assignment change process is performed.

Assuming that the number of batteries included in the storage system (that is, the number of CEs) is N, the predetermined threshold is set to a value which is equal to or smaller than (N-1). The reason for this is that, in a case in which the number of CEs, which include normal batteries, is 1, it is difficult to perform the write-back operation while duplicating the data of local caches between a plurality of CEs which have normal batteries.

(S23) The instruction control unit 116 identifies CMs to be synchronized with regard to the local caches thereof with the physical storage areas, with reference to the configuration management table 113b. Specifically, the instruction control unit 116 identifies CMs in the CEs which have abnormal batteries, and CMs which mirror the data of the local caches thereof to the CMs in the CEs which have abnormal batteries, as the CMs to be synchronized.

The instruction control unit 116 transmits a synchronization instruction, which instructs to synchronize data stored in the local cache, to the identified CMs. When the instruction control unit 116 receives completion notifications from the CMs, to which the synchronization instruction is transmitted, the process proceeds to S24. In a case in which an identified CM is the master CM (CM 110), the instruction control unit 116 transmits the synchronization instruction to the change control unit 117 of the CM 110.

(S24) The instruction control unit 116 determines details of change in the assignment of the local caches and the mirror caches with reference to the configuration management table 113b.

(S25) The instruction control unit 116 outputs an assignment change instruction to CMs to which the local cache or the mirror cache is newly assigned. When the instruction control unit 116 receives a completion notification from the CMs to which the assignment change instruction is transmitted, the process proceeds to S26. In a case in which a CM to which the local cache or the mirror cache is newly assigned is the master CM (CM 110), the instruction control unit 116 transmits the assignment change instruction to the change control unit 117 of the CM 110.

(S26) The instruction control unit 116 transmits, to CMs which have been assigned with a local cache to be newly assigned to another CM, a transmission instruction for transmitting the data of the local cache. At this time, the instruction control unit 116 calculates the capacity of the RAM which is to be secured for the local cache in the assignment change destination CM, and instructs to transmit the data of the local cache amounting to the calculated capacity.

When the instruction control unit 116 receives a completion notification from the CMs to which the transmission instruction is transmitted, the process proceeds to S27. In a case in which a CM which has been assigned with a local cache to be newly assigned to another CM is the master CM (CM 110), the instruction control unit 116 transmits the transmission instruction to the change control unit 117 of the CM 110.

(S27) The change control unit 117 updates the items corresponding to the current state of the volume management table 113a. In addition, the change control unit 117 updates the configuration management table 113b such that CMs in the CEs which have abnormal batteries are excluded from the cyclic arrangement. Thereafter, the process proceeds to S29.

(S28) The instruction control unit 116 performs the operation switch process.

(S29) The change control unit 117 transmits the updated volume management table 113a to all the CMs. Thereafter, the change control unit 117 ends the process.

In the determination in S22, the capacity of the local cache may be compared with a predetermined threshold. The capacity is the minimum capacity of the RAM which is assigned with one local cache in the assignment change destination CM, assuming that the assignment destination CM of the local cache is changed as determined in S24. For example, a case in which the battery 240 of the CE 200 does not work in the above-described first state is taken into consideration. Here, in a case in which the assignment destination of the local cache LC2 is changed from the CM 210 to the CM 110, the capacity of the RAM which is assigned with the local cache LC2 in the CM 110 is smaller than the capacity acquired before the assignment change. In S22, the capacity of the RAM which is assigned with the local cache LC2 in the CM 110 as described above is compared with a predetermined threshold.

In a case in which the capacity is equal to or smaller than the predetermined threshold, the capacity of the local cache to be used to access an LU is small, and thus it is estimated that it is difficult to perform effective access control. In addition, in a case in which the capacity is equal to or smaller than the predetermined threshold, the number of LUs controlled by the CM is too large, and thus it is estimated that the access speed for each LU is remarkably slow. Therefore, in the determination in S22, in a case in which the capacity is equal to or smaller than the predetermined threshold, the process in S28 may be performed, and, in a case in which the capacity is larger than the predetermined threshold, the process in S23 may be performed.

In addition, as another example, in the determination in S22, the number of LUs controlled by one CM may be compared with a predetermined threshold. The number of LUs is the maximum number of LUs for which the assignment change destination CM performs access control using the local cache in the CM, assuming that the assignment destination CM of the local cache is changed as determined in S24. In this example, in a case in which the number of LUs is equal to or larger than a predetermined threshold, it is estimated that the access speed for each LU is remarkably slow. Therefore, in the determination in S22, in a case in which the number of LUs is equal to or larger than the predetermined threshold, a process in S28 may be performed, and, in a case in which the number of LUs is smaller than the predetermined threshold, the process in S23 may be performed.

In a case in which the capacity of the local cache is compared with a predetermined threshold or in a case in which the number of LUs is compared with a predetermined threshold, the process of FIG. 18 is changed such that the process in S24 is performed before the determination is performed in S22 to allow the instruction control unit 116 to recognize the state after the assignment change.

Figure 19:
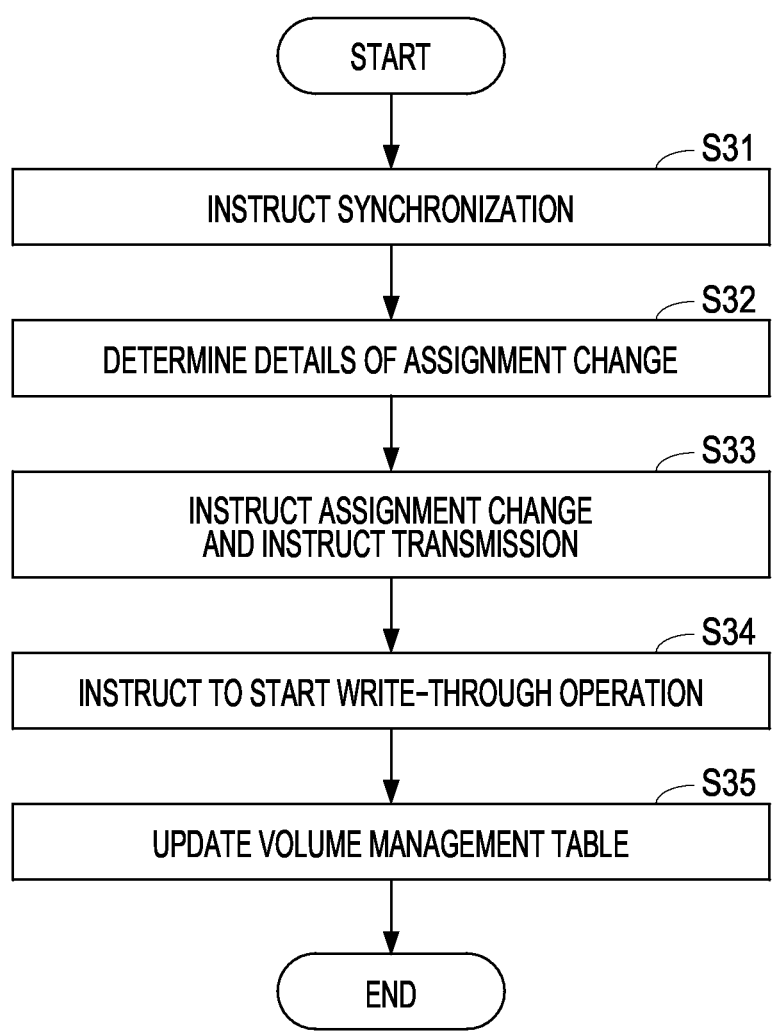
FIG. 19 is a flowchart illustrating an example of an operation switch process.

FIG. 19 is a flowchart illustrating an example of the operation switch process. Hereinafter, the process illustrated in FIG. 19 will be described. The process illustrated in FIG. 19 corresponds to the process in S28.

(S31) The instruction control unit 116 identifies CMs to be synchronized with regard to the local caches thereof with the physical storage areas. The instruction control unit 116, first, identifies CMs in the CEs which have abnormal batteries as the CMs to be synchronized. Furthermore, the instruction control unit 116 of the CM 110 identifies CMs which mirror the data of the local caches thereof to the CMs in the CEs which have abnormal batteries, as the CM which to be synchronized on the basis of the volume management table 113*a*.

The instruction control unit 116 transmits a synchronization instruction, which instructs to synchronize data stored in the local cache, to the identified CMs. When the instruction control unit 116 receives completion notifications from the CMs, to which the synchronization instruction are transmitted, the process proceeds to S32. In a case in which an identified CM is the master CM (CM 110), the instruction control unit 116 transmits the synchronization instruction to the change control unit 117 of the CM 110.

(S32) The instruction control unit 116 determines details of change in the assignment of the local caches on the basis of the volume management table 113*a*. In addition, the instruction control unit 116 identifies CMs for which the assignment of the mirror caches is to be changed (CMs to which the mirror caches are not assigned).

(S33) The instruction control unit 116 transmits an assignment change instruction to the CMs to which the local cache is newly assigned and the CMs to which the mirror caches are not assigned. In addition, the instruction control unit 116 transmits a transmission instruction, which instructs a CM to transmit the data of the local cache thereof to an assignment change destination CM, to the CMs which have been assigned with a local cache to be newly assigned to another CM. The instruction control unit 116 also instructs the CM, to which the transmission instruction is transmitted, to erase the data of the local cache targeted by the transmission instruction and to release the assignment.

(S34) The instruction control unit 116 identifies CMs to be switched to the write-through operation. The instruction control unit 116 transmits an instruction for starting the write-through operation to the identified CMs.

(S35) The change control unit 117 updates the item corresponding to the current state of the volume management table 113*a*.

In a case in which a large number of local caches are assigned to one CM, loads on the CM may increase because accesses are concentrated on the CM. According to the second embodiment, a predetermined threshold is provided and the assignment of a large number of local caches to one CM is avoided. When the number of local caches is equal to or larger than the predetermined threshold (Yes in S22), the instruction control unit 116 switches the write control of LUs to the write-through method. Therefore, it is possible to avoid that accesses are concentrated on one CM and that loads on the one CM are increased.

Figure 20:
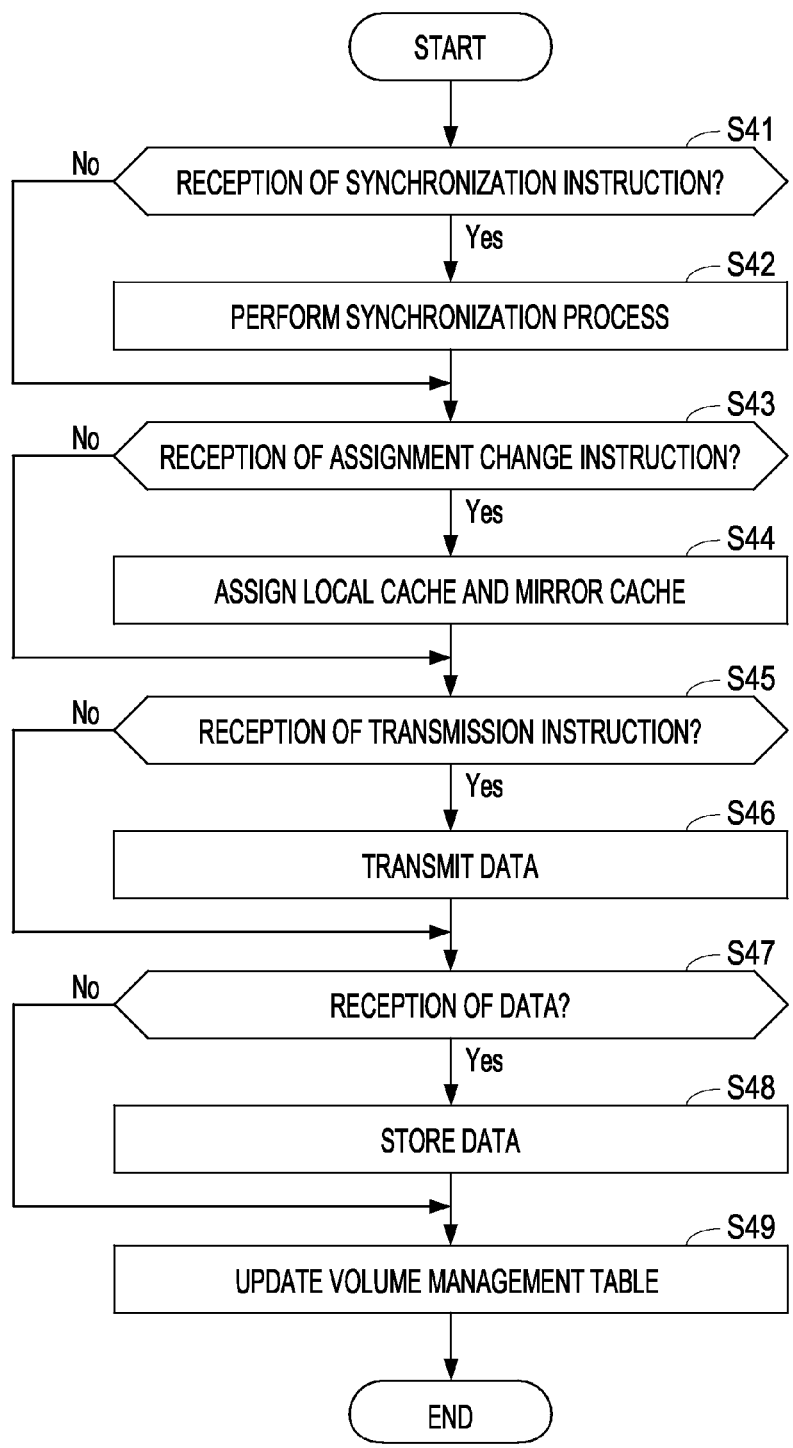
FIG. 20 is a flowchart illustrating an example of processes of each CM in an assignment change process.

FIG. 20 is a flowchart illustrating an example of processes of each CM in the assignment change process. Hereinafter, the processes illustrated in FIG. 20 will be described. In FIG. 20, processes performed by the CM 110 will be described as an example.

(S41) The change control unit 117 determines whether or not a synchronization instruction is received from the master CM. In a case in which the synchronization instruction is received, the process proceeds to S42. In a case in which the synchronization instruction is not received, the process proceeds to S43.

In a case in which the CM is set as the master CM, the change control unit 117 receives a notification of the synchronization instruction from the instruction control unit 116. In a case in which the notification of the synchronization instruction is received from the instruction control unit 116, the process proceeds to S42.

(S42) The change control unit 117 writes data which is not yet stored in the physical storage area (HDD) assigned to the local cache, among the data stored in the local cache, to the physical storage area. When the write is completed, the change control unit 117 transmits a synchronization completion notification to the master CM.

(S43) The change control unit 117 determines whether or not an assignment change instruction is received from the master CM. In a case in which the assignment change instruction is received, the process proceeds to S44. In a case in which the assignment change instruction is not received, the process proceeds to S45.

In a case in which the CM is set as the master CM, the change control unit 117 receives a notification of the assignment change instruction from the instruction control unit 116. In a case in which the assignment change instruction is received from the instruction control unit 116, the process proceeds to S44.

(S44) The change control unit 117 secures an area of the local cache or the mirror cache, to which new assignment is instructed through the assignment change instruction, on the RAM. Thus, the local cache or the mirror cache is newly assigned. When the assignment process is completed, the change control unit 117 transmits a completion notification to the master CM.

(S45) The change control unit 117 determines whether or not a transmission instruction is received from the master CM. In a case in which the transmission instruction is received, the process proceeds to S46. In a case in which the transmission instruction is not received, the process proceeds to S47.

In a case in which the CM is set as the master CM, the change control unit 117 receives a notification of the transmission instruction from the instruction control unit 116. In a case in which the notification of the transmission instruction is received from the instruction control unit 116, the process proceeds to S46.

(S46) The change control unit 117 transmits the data stored in the local cache to the CM which is designated by the transmission instruction. When the transmission is normally completed, change control unit 117 transmits a completion notification to the master CM and the process proceeds to S47.

(S47) The change control unit 117 determines whether or not the data of the local cache which is transmitted from another CM is received. In a case in which the data of the local cache which is transmitted from another CM is received, the process proceeds to S48. In a case in which no data of the local cache which is transmitted from another CM is received, the process proceeds to S49.

(S48) The change control unit 117 stores the received data in the local cache area secured in S44.

(S49) The change control unit 117 receives the contents of the updated volume management table 113*a* from the master CM. The change control unit 117 updates the contents of the volume management table 113*a* maintained by its own device with the received contents. Thereafter, the change control unit 117 ends the process.

Figure 21:
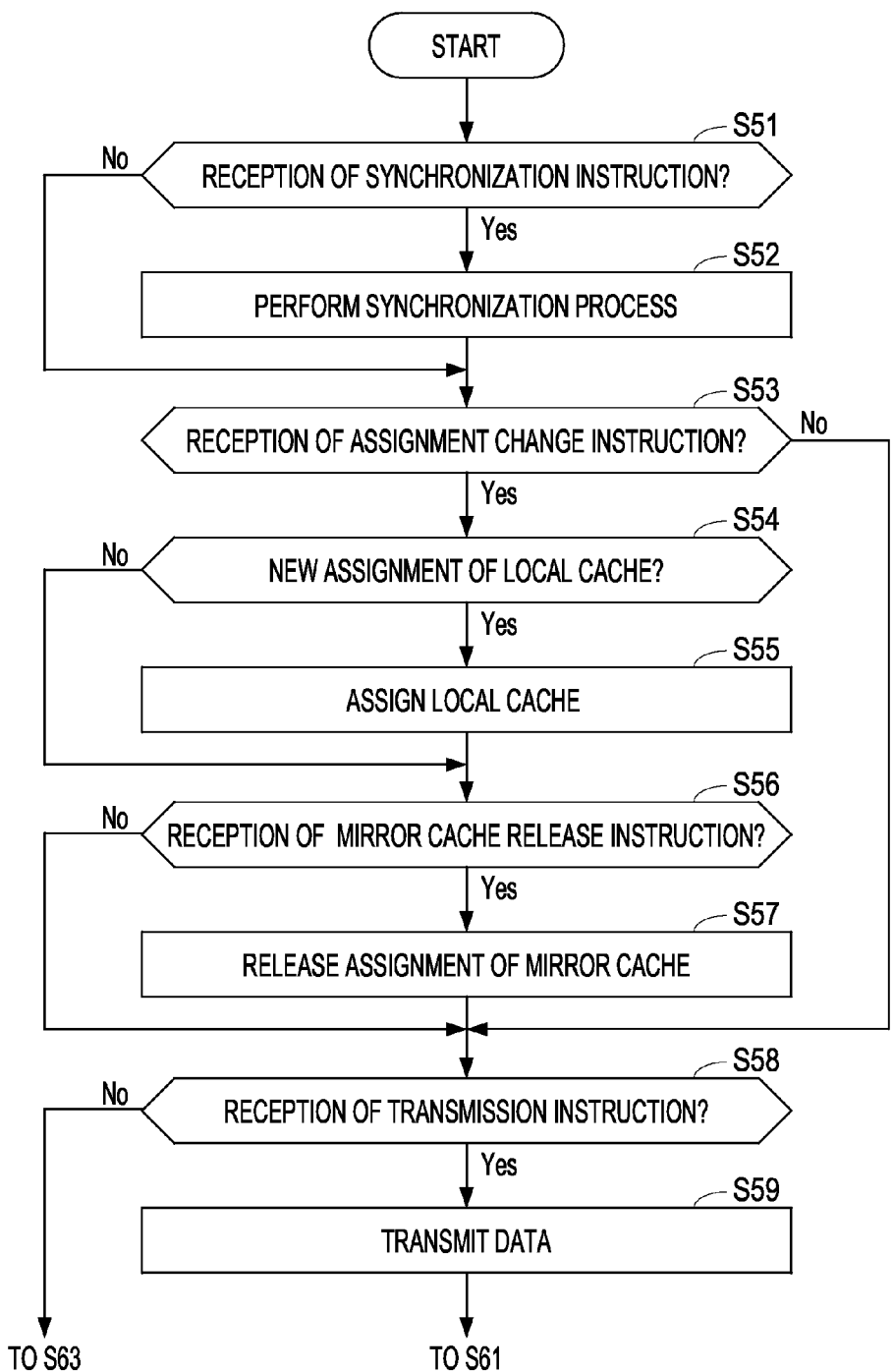
FIG. 21 is a flowchart illustrating an example of processes of each CM in an operation switch process.
Figure 22:
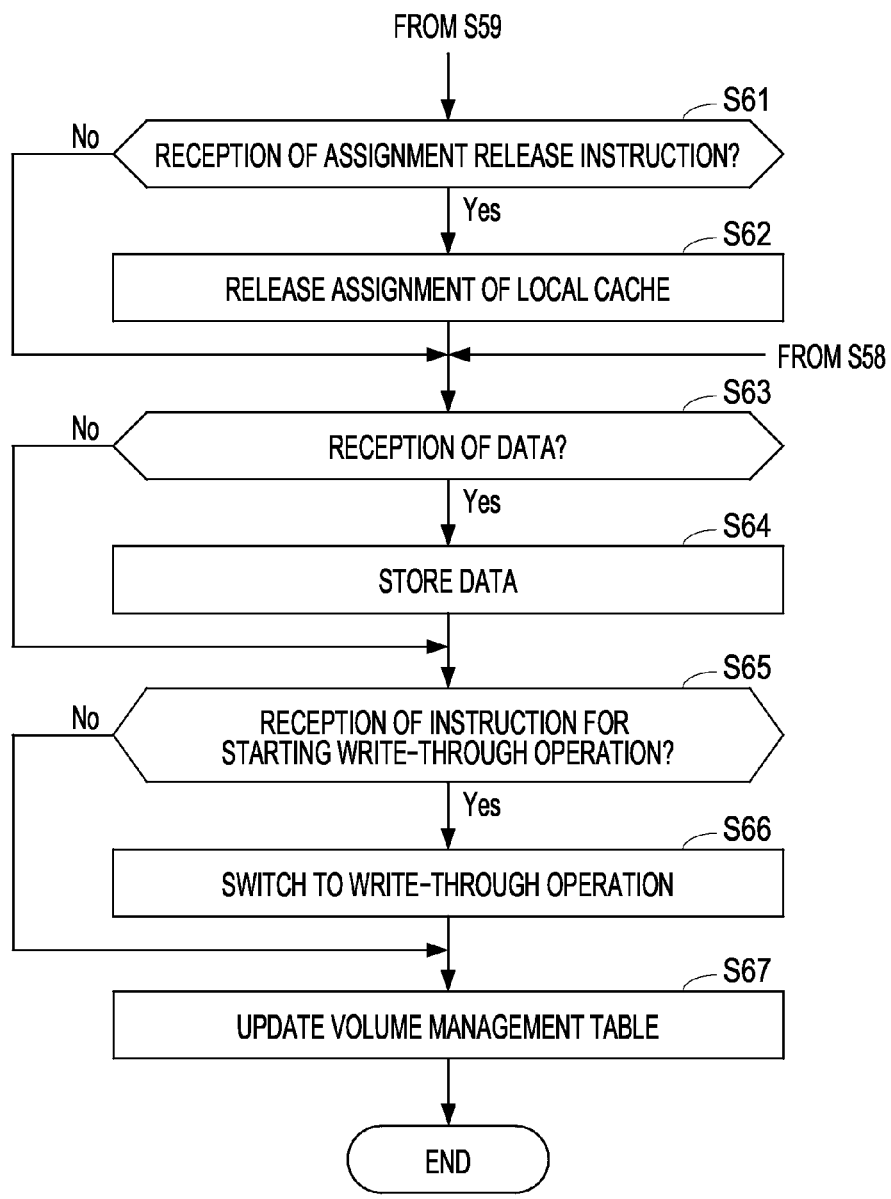
FIG. 22 is a flowchart illustrating an example of processes of each CM in an operation switch process.

FIGS. 21 and 22 are flowcharts illustrating an example of processes of each CM in the operation switch process. Hereinafter, the processes illustrated in FIGS. 21 and 22 will be described. In FIGS. 21 and 22, description will be given while it is assumed that the processes are performed by the CM 110.

(S51) The change control unit 117 determines whether or not a synchronization instruction is received from the master CM. In a case in which the synchronization instruction is received, the process proceeds to S52. In a case in which the synchronization instruction is not received, the process proceeds to S53.

In a case in which the CM is set as the master CM, the change control unit 117 receives a notification of the synchronization instruction from the instruction control unit 116. In a case in which the notification of the synchronization instruction is received from the instruction control unit 116, the process proceeds to S52.

(S52) The change control unit 117 writes data which is not yet stored in the physical storage area (HDD) assigned to the local cache area 111, among the data stored in the local cache area 111, to the physical storage area. When the write is completed, the change control unit 117 transmits a synchronization completion notification to the master CM.

(S53) The change control unit 117 determines whether or not an assignment change instruction is received from the master CM. In a case in which the assignment change instruction is received, the process proceeds to S54. In a case in which the assignment change instruction is not received, the process proceeds to S58.

In a case in which the CM is set as the master CM, the change control unit 117 receives a notification of the assignment change instruction from the instruction control unit 116. In a case in which the assignment change instruction is received from the instruction control unit 116, the process proceeds to S54.

(S54) The change control unit 117 determines whether or not new assignment of a local cache is instructed through the assignment change instruction. In a case in which the new assignment of a local cache is instructed, the process proceeds to S55. In a case in which the new assignment of a local cache is not instructed, the process proceeds to S56.

(S55) The change control unit 117 secures an area of the local cache, to which the new assignment is instructed through the assignment change instruction, on the RAM. Thus, a new local cache is assigned. When the assignment process is completed, the change control unit 117 transmits a completion notification to the master CM.

(S56) The change control unit 117 determines whether or not release of a mirror cache is instructed through the assignment change instruction. In a case in which release of a mirror cache is instructed, the process proceeds to S57. In a case in which release of a mirror cache is not instructed, the process proceeds to S58.

(S57) The change control unit 117 erases the data stored in the mirror cache, and releases the assignment of the mirror cache.

(S58) The change control unit 117 determines whether or not a transmission instruction is received from the master CM. In a case in which the transmission instruction is received, the process proceeds to S59. In a case in which the transmission instruction is not received, the process proceeds to S63.

In a case in which the CM is set as the master CM, the change control unit 117 receives a notification of the transmission instruction from the instruction control unit 116. In a case in which the notification of the transmission instruction from the instruction control unit 116, the process proceeds to S59.

(S59) The change control unit 117 transmits the data stored in the local cache to a CM which is designated by the transmission instruction. When the transmission is normally completed, the change control unit 117 transmits a completion notification to the master CM, and the process proceeds to S61.

(S61) The change control unit 117 determines whether or not an assignment release instruction which instructs to release the assignment of the local cache is received from the master CM. In a case in which the assignment release instruction is received, the process proceeds to S62. In a case in which the assignment release instruction is not received, the process proceeds to S63.

In a case in which the CM is set as the master CM, the change control unit 117 receives a notification of the assignment release instruction from the instruction control unit 116. In a case in which the assignment release instruction is received from the instruction control unit 116, the process proceeds to S62.

(S62) The change control unit 117 erases the data stored in the local cache, and releases the assignment of the local cache.

(S63) The change control unit 117 determines whether or not data, which is transmitted from another CM, is received. In a case in which the data is received, the process proceeds to S64. In a case in which the data is not received, the process proceeds to S65.

(S64) The change control unit 117 stores the received data in the area of the local cache which is secured in the RAM in S55.

(S65) The change control unit 117 determines whether or not an instruction for starting the write-through operation is received. In a case in which the instruction for starting the write-through operation is received, the process proceeds to S66. In a case in which the instruction for starting the write-through operation is not received, the process proceeds to S67.

In a case in which the CM is set as the master CM, the change control unit 117 receives a notification of the instruction for starting the write-through operation from the instruction control unit 116. In a case in which the change control unit 117 receives the start instruction from the instruction control unit 116, the process proceeds to S66.

(S66) The access control unit 114 switches the operation method from the write-back operation to the write-through operation, and starts to perform access control to the LUs. At this time, the access control unit 114 controls the write to the LUs through the write-through method.

(S67) The change control unit 117 receives the contents of the updated volume management table 113*a* from the master CM. The change control unit 117 updates the contents of the volume management table 113*a* which is maintained by its own device with the received contents. Thereafter, the change control unit 117 ends the process.

Subsequently, a case in which an abnormal battery is replaced with a normal battery and the number of abnormal batteries becomes smaller than the predetermined threshold will be described.

Figure 23:
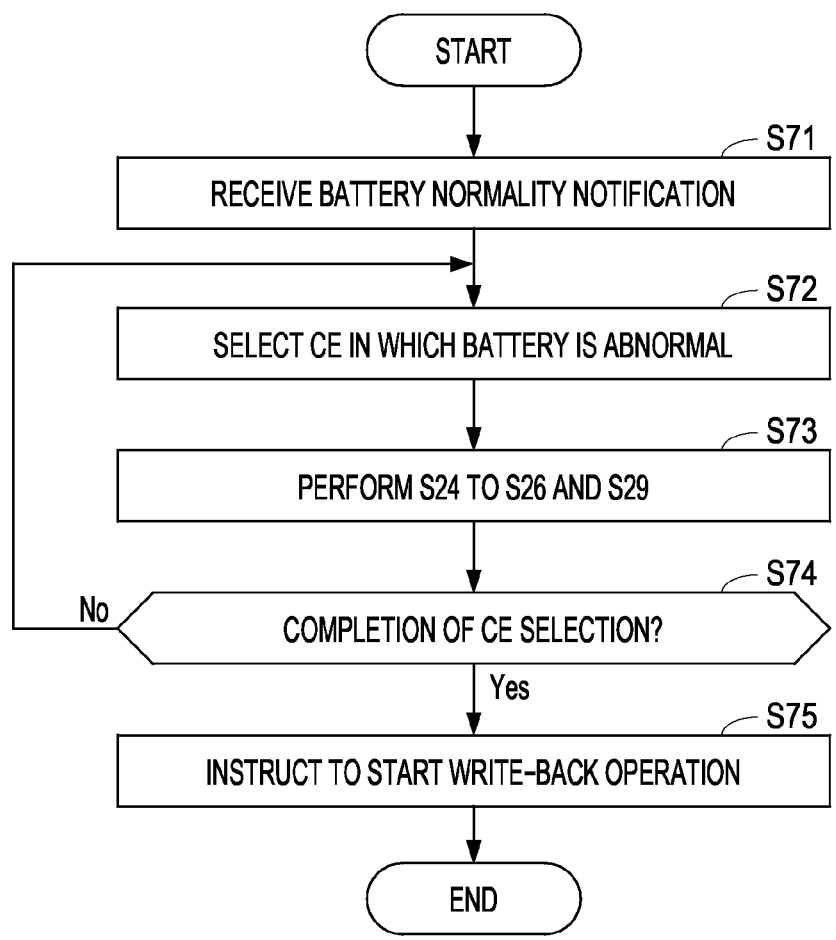
FIG. 23 is a flowchart illustrating an example of processes of a master CM in a case in which the number of abnormal batteries is smaller than a threshold.

FIG. 23 is a flowchart illustrating an example of processes of the master CM in a case in which the number of abnormal batteries is smaller than the predetermined threshold. In FIG. 23, it is assumed that the CM 110 is set as the master CM. Hereinafter, the processes illustrated in FIG. 23 will be described.

(S71) The instruction control unit 116 receives a battery normality notification from an in-CE master. The battery normality notification includes information that indicates which battery is normal.

(S72) The instruction control unit 116 selects one CE in which the battery is abnormal.

(S73) The instruction control unit 116 performs the processes in S24 to S26 and in S29 while assuming that a new abnormality has occurred in the battery of the CE which is selected in S72.

(S74) The instruction control unit 116 determines whether or not all the CEs which have normal batteries have been selected. In a case in which there is a not-yet-selected CE, the process proceeds to S72 and another CE is selected. In a case in which all the CEs have been selected, the process proceeds to S75.

With the above processes, the system becomes in a state in which local caches and mirror caches are not assigned to the CMs in the CEs in which the battery is abnormal.

(S75) The instruction control unit 116 instructs the CMs, to which local caches are assigned, to start the write-back operation.

Subsequently, a case in which any of abnormal batteries is replaced with a normal battery in a state in which the number of abnormal batteries is smaller than the predetermined threshold will be described.

Figure 24:
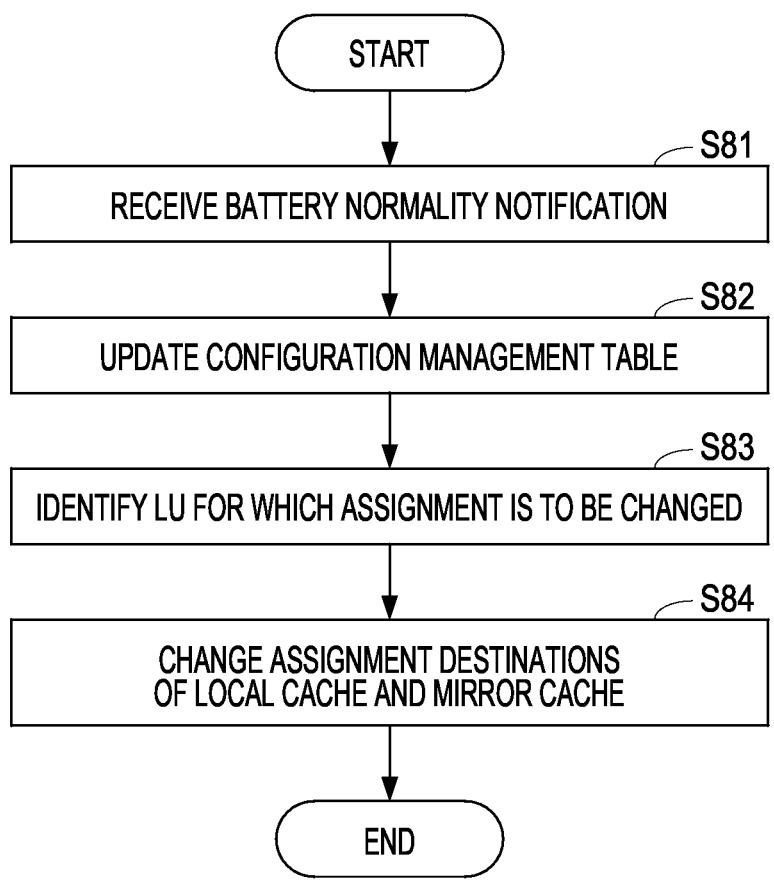
FIG. 24 is a flowchart illustrating an example of processes of a master CM in a case in which a normal battery further increases.

FIG. 24 is a flowchart illustrating an example of processes of the master CM in a case in which a normal battery further increases. In FIG. 24, it is assumed that the CM 110 is set as the master CM. Hereinafter, the processes illustrated in FIG. 24 will be described.

(S81) The instruction control unit 116 receives a battery normality notification from an in-CE master. The battery normality notification includes information that indicates which battery is normal.

(S82) The instruction control unit 116 updates the configuration management table 113b such that CMs in the CE which has a replaced battery are inserted into the cyclic arrangement.

(S83) The instruction control unit 116 identifies LUs for which the assignment of the local caches or the mirror caches is to be changed. Specifically, the instruction control unit 116 identifies CMs on the back side and the front side of the CMs in the CE which has the replaced battery, in the cyclic arrangement, on the basis of the configuration management table 113b which is updated in S82. The instruction control unit 116 identifies LUs, for which the identified CMs on the back side and the front side are registered as the assignment destinations of the local caches and the mirror caches, respectively, in the volume management table 113a.

(S84) The instruction control unit 116 changes the assignment destinations of any of the local caches and the mirror caches for the LUs which are identified in S83. For example, the instruction control unit 116 changes the mirror cache assignment destination CMs to the front-side CMs which are identified in S83, for LUs for which the local cache assignment destination CMs are the same as in the initial state on the basis of the volume management table 113a. The instruction control unit 116 also changes the local cache assignment destination CMs to the back-side CMs which are identified in S83, for LUs for which the mirror cache assignment destination CMs are the same as in the initial state on the basis of the volume management table 113a. In addition, the instruction control unit 116 changes the local cache assignment destination CMs to the back-side CMs which are identified in S83, or changes the mirror cache assignment destination CMs to the front-side CMs which are identified in S83, for LUs in which both the local cache assignment destination CMs and the mirror cache assignment destination CMs are different from the initial state on the basis of the volume management table 113a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system, comprising:
a plurality of control devices defined as disposed in a circular arrangement, the plurality of control devices each including:
a memory to which a local cache and a mirror cache are assigned, and
a first processor coupled to the memory and the first processor configured to
control write to a storage device of a plurality of storage devices by using the local cache through a write-back method, the storage device being associated with the local cache, and
mirror data of the local cache to the mirror cache assigned to the memory of another control device of the plurality of control devices, the another control device being disposed adjacent in a first direction in the circular arrangement;
an electric power source configured to supply electric power to the memory included in each of the plurality of control devices;
a plurality of batteries associated with the plurality of control devices such that control devices disposed adjacent to each other in the circular arrangement are associated with different batteries, each of the plurality of batteries supplying electric power to the memory included in each of the plurality of control devices associated with each of the plurality of batteries in a case in which the electric power of the electric power source is cut off; and
a second processor configured to
determine a number of abnormal batteries among the plurality of batteries in a case in which a first abnormality has occurred in a first battery of the plurality of batteries,
assign a second local cache to a first memory of a first control device in a case in which the number of abnormal batteries is smaller than a predetermined threshold, the second local cache being currently assigned to a second memory of a second control device associated with the first battery, the first control device being disposed adjacent to the second control device in a reverse direction of the first direction in the circular arrangement,
assign a first mirror cache to a third memory of a third control device in a case in which the number of abnormal batteries is smaller than the predetermined threshold, the first mirror cache being currently assigned to the second memory, the third control device being disposed adjacent to the second control device in the first direction in the circular arrangement,
instruct the first control device to control write to a first storage device associated with a first local cache by using the first local cache through the write-back method, data of the first local cache being mirrored to the first mirror cache, and instruct the first control device to control write to a second storage device associated with the second local cache by using the second local cache through the write-back method.

2. The storage system according to claim 1, wherein the first processor of the first control device is configured to
write, in a case in which the second storage device is coupled to the second control device, data stored in the second local cache assigned to the first memory to the second storage device through the second control device.

3. The storage system according to claim 1, wherein the second processor is configured to
instruct, in a case in which the first abnormality has occurred and the number of abnormal batteries is equal to or larger than the predetermined threshold, the second control device to control the write to the second storage device by using the second local cache through a write-through method different from the write-back method.

4. The storage system according to claim 1, wherein the second processor is configured to
assign the second local cache back to the second memory in a case in which a second abnormality has occurred in a second battery of the plurality of batteries after the first abnormality has occurred and the number of abnormal batteries reaches the predetermined threshold, the second battery being different from the first battery, and
instruct the second control device to control the write to the second storage device by using the second local cache through a write-through method different from the write-back method.

5. The storage system according to claim 1, wherein the second processor is included in one of the plurality of control devices.

6. The storage system according to claim 1, further comprising:
a monitor device including the second processor, the monitor device being different from any of the plurality of control devices.

7. A monitor device, comprising:
a memory; and
a processor coupled to the memory and the processor configured to
determine a number of abnormal batteries among a plurality of batteries in a case in which a first abnormality has occurred in a first battery of the plurality of batteries, the plurality of batteries being associated with a plurality of control devices such that control devices disposed adjacent to each other are associated with different batteries, the plurality of control devices being defined as disposed in a circular arrangement, each of the plurality of batteries supplying electric power to a memory included in each of the plurality of control devices associated with each of the plurality of batteries in a case in which the electric power of an electric power source is cut off, the electric power source being configured to supply electric power to the memory included in each of the plurality of control devices,
assign a second local cache to a first memory of a first control device in a case in which the number of abnormal batteries is smaller than a predetermined threshold, the second local cache being currently assigned to a second memory of a second control device associated with the first battery, the first control device being disposed adjacent to the second control device in a first direction in the circular arrangement,
assign a first mirror cache to a third memory of a third control device in a case in which the number of abnormal batteries is smaller than the predetermined threshold, the first mirror cache being currently assigned to the second memory, the third control device being disposed adjacent to the second control device in a reverse direction of the first direction in the circular arrangement,
instruct the first control device to control write to a first storage device associated with a first local cache by using the first local cache through a write-back method, data of the first local cache being mirrored to the first mirror cache, and
instruct the first control device to control write to a second storage device associated with the second local cache by using the second local cache through the write-back method.

8. A non-transitory computer-readable recording medium having stored therein a program that causes a computer to execute a process, the process comprising:
determining a number of abnormal batteries among a plurality of batteries in a case in which a first abnormality has occurred in a first battery of the plurality of batteries, the plurality of batteries being associated with a plurality of control devices such that control devices disposed adjacent to each other are associated with different batteries, the plurality of control devices being defined as disposed in a circular arrangement, each of the plurality of batteries supplying electric power to a memory included in each of the plurality of control devices associated with each of the plurality of batteries in a case in which the electric power of an electric power source is cut off, the electric power source being configured to supply electric power to the memory included in each of the plurality of control devices;
assigning a second local cache to a first memory of a first control device in a case in which the number of abnormal batteries is smaller than a predetermined threshold, the second local cache being currently assigned to a second memory of a second control device associated with the first battery, the first control device being disposed adjacent to the second control device in a first direction in the circular arrangement;
assigning a first mirror cache to a third memory of a third control device in a case in which the number of abnormal batteries is smaller than the predetermined threshold, the first mirror cache being currently assigned to the second memory, the third control device being disposed adjacent to the second control device in a reverse direction of the first direction in the circular arrangement;
instructing the first control device to control write to a first storage device associated with a first local cache by using the first local cache through a write-back method, data of the first local cache being mirrored to the first mirror cache; and
instructing the first control device to control write to a second storage device associated with the second local cache by using the second local cache through the write-back method.

\* \* \* \* \*